US006790349B1

(12) United States Patent
Sawyer

(10) Patent No.: US 6,790,349 B1
(45) Date of Patent: Sep. 14, 2004

(54) MOBILE APPARATUS FOR TREATMENT OF WET MATERIAL

(75) Inventor: Bud Sawyer, New Providence, IA (US)

(73) Assignee: Global Resource Recovery Organization, Inc., Bradenton, FL (US)

( * ) Notice: Subject to any disclaimer, the term of this patent is extended or adjusted under 35 U.S.C. 154(b) by 0 days.

(21) Appl. No.: 10/429,907

(22) Filed: May 5, 2003

(51) Int. Cl.[7] .......................... B01D 19/00; B01D 45/16; B04C 3/02; B04C 3/04

(52) U.S. Cl. ........................ 210/173; 210/180; 210/218; 210/259; 210/416.1; 210/512.1; 210/512.2; 210/770; 96/243

(58) Field of Search ................................ 210/173, 175, 210/180, 183, 198.1, 218, 252, 259, 416.1, 768, 512.1, 770, 512.2, 771, 787; 96/234, 240, 243, 322

(56) References Cited

U.S. PATENT DOCUMENTS 1,830,174 A 11/1931 Peebles
3,794,251 A 2/1974 Williams
3,800,429 A 4/1974 Lindl
3,937,405 A 2/1976 Stephanoff
4,169,714 A * 10/1979 Calvert .......................... 95/62
4,171,960 A * 10/1979 Jarvenpaa .................... 96/282
4,187,615 A 2/1980 Iwata
4,236,321 A 12/1980 Palmonari
4,390,131 A 6/1983 Pickrel
4,423,987 A 1/1984 Powers
4,478,862 A 10/1984 Greethead
4,489,503 A 12/1984 Browne
4,505,051 A 3/1985 Herchenbach
4,532,155 A 7/1985 Golant
4,555,254 A 11/1985 Fisher
4,735,708 A 4/1988 Shah
4,736,527 A 4/1988 Iwamoto (List continued on next page.)

*Primary Examiner*—Fred G. Prince
(74) *Attorney, Agent, or Firm*—Daniel A. Rosenberg; Kent A. Herink; Davis Law Firm

(57) ABSTRACT

A waste treatment apparatus for the treatment and processing of wet material is provided. The apparatus comprises an inlet hopper adapted for receipt of the wet material. A pre-conditioning unit is provided having an input and an output end wherein the wet material is received from the inlet hopper at the input end and is conveyed to the output end wherein the wet material is processed to reduce moisture and pathogen content. A blower is provided for providing a forced air stream to direct the flow of the wet material and for directing the flow from the output end of the pre-conditioning unit. A pre-separation cyclone is provided and is operatively positioned for receiving the wet material from the output end of the pre-conditioning unit via the air stream powered by the blower, wherein the wet material is processed under the influence of cyclonic forces that further reduce the moisture content, pathogen content, and reduce the particle size of the wet material. A separation cyclone is provided and is operatively positioned for receiving the wet material from the pre-separation cyclone via the air stream powered by the blower, wherein the wet material is processed under the influence of cyclonic forces that separate the wet material into a substantially dry portion that exits from a lower portion of the separation cyclone and a substantially liquid or vapor portion that exits from an upper portion of the separation cyclone. A wet scrubber is provided and is operatively positioned for receiving the substantially liquid portion of the wet material.

14 Claims, 28 Drawing Sheets

U.S. PATENT DOCUMENTS 4,756,093 A 7/1988 Heinemann
4,853,010 A * 8/1989 Spence et al. ................. 96/52
4,872,998 A 10/1989 Dausman
5,039,498 A 8/1991 Vicard
5,068,979 A 12/1991 Wireman
5,069,801 A 12/1991 Girovich
5,074,476 A 12/1991 Mund
5,096,744 A 3/1992 Takei
5,114,568 A 5/1992 Brinsmead
5,143,303 A 9/1992 Niemi
5,236,132 A 8/1993 Rowley, Jr.
5,242,585 A * 9/1993 Krofta ........................ 210/188
5,346,141 A 9/1994 Kim
5,413,285 A 5/1995 Matthews
5,421,524 A 6/1995 Haddow
5,426,866 A 6/1995 Rumocki
5,474,686 A 12/1995 Barr
5,598,979 A 2/1997 Rowley, Jr.
5,611,363 A 3/1997 Campbell
5,637,152 A 6/1997 Robinson
5,685,974 A 11/1997 Fleming
5,727,740 A 3/1998 Robinson
5,771,601 A 6/1998 Veal
5,791,066 A 8/1998 Crews
5,819,955 A 10/1998 Clarke
5,840,198 A 11/1998 Clarke
5,908,164 A 6/1999 Robinson
5,915,814 A 6/1999 Crews
6,033,570 A 3/2000 Grise
6,059,977 A 5/2000 Rowney
6,082,548 A 7/2000 Stephenson
6,126,096 A 10/2000 Robinson
6,149,345 A 11/2000 Atkins
6,412,716 B1 7/2002 Robinson
6,506,311 B2 1/2003 DeGarmo et al.

* cited by examiner 30
102
108
116
106
114
118
98

MOBILE APPARATUS FOR TREATMENT OF WET MATERIAL

BACKGROUND OF THE INVENTION

1. Field of the Invention

The present invention relates to an apparatus and method for the processing of wet material. In particular, to an apparatus that utilizes cyclonic forces and a heat processing to separate and size reduce wet material and for pathogen reduction.

2. Background

A wide range of commercial and municipal industrial operations produce wet materials as a byproduct of these various industrial processes. For example, in the United States municipal facilities that use biological processes to treat waste water solids create enormous quantities of biosolids. The Environmental Protection Agency ("EPA") estimates that such facilities generated 6.9 million tons of biosolids in 1998, and the EPA predicts this output will continue to increase for the foreseeable future. Biosolids consist of nutrient rich organic matter produced from the stabilization of sewage sludge and residential septage and under the right conditions can be reclaimed or recycled for use as a land applied fertilizer. However, in its raw form biosolids are a pollutant subject to strict federal regulation at the hands of the EPA, and biosolids are similarly regulated by counterpart state and municipal authorities as well.

Considerable effort has been devoted to recycling or reclaiming biosolids for beneficial uses like for use as a land applicant fertilizer. The various treatment schemes include alkaline stabilization with such substances as lime, cement, or ash; anaerobic biological digestion in large closed tanks to allow decomposition through introduction of microorganisms; aerobic digestion in vessels that utilize aerobic bacteria to convert biosolids to $CO_2$ and water; composting which regulates decomposition in a manner that elevates the temperature of the biosolids to a level that will destroy most pathogens; other processes include heat drying and pelletizing through the use of passive or active dryers, and dewatering. These efforts have met with some success but generally have been hindered by a public opposition based on concerns about pollution, odor, risk of disease, and other perceived nuisance issues, and by the strict regulatory frameworks that govern the use and recovery of biosolids. Again, the EPA estimates that in 1998 only 41% of biosolids were sufficiently reclaimed to allow for land application, another 19% were reclaimed for other beneficial uses; however, a full 37% of biosolids were incinerated or disposed of at landfills.

The concerns of the public with regard to the collection, reclamation, and subsequent use of biosolids are not totally unfounded. Untreated or minimally treated biosolids could carry pathogens, disease-causing organisms, which include certain bacteria, viruses, or parasites. Furthermore, biosolids are a vector attractant for such organisms as rodents and insects that can carry diseases in their own right, or become carriers of biosolid pathogens. There is concern about biosolid contamination of ground and surface water supplies. As a result, the use of biosolids is regulated to reduce these risks and set standards for the subsequent use of processed biosolids. The EPA framework for regulation generally classifies biosolids into two groups based on the level of potential risks to society.

Class A biosolids typically undergo advanced treatment to reduce pathogen levels to low levels. Normally, this is achieved through the previously discussed methods of heat drying, composting, or high-temperature aerobic digestion. Provided that the biosolids also meet the requirements for metal concentration and vector attraction reduction, Class A biosolids can be used freely and for the same purposes as any other fertilizer or soil amendment product.

Class B biosolids are treated to reduce pathogens to levels protective of human health and the environment, with limited access. Thus, the use of Class B biosolids require crop harvesting and site restriction, which minimize the potential for human and animal contact until natural attenuation of pathogens has occurred. Class B biosolids cannot be sold or given away for use on sites such as lawns and home gardens, but can be used in bulk on agricultural lands, reclamation sites, and other controlled sites provided that certain vector, pollutant, and management practice requirements are also met.

Clearly, it is highly desirable to process biosolids into a Class A product, however, the prior art methods of doing so leave much room for improvement in that these methods of treating biosolids involve large, expensive, fixed resources. The biosolid processing or treatment sites are usually not located at a majority of the generation sites thereby requiring transportation of the biosolids. Or, a biosolid treatment facility must be constructed adjacent to each collection facility. In addition, many of these processes are slow thereby limiting the efficiency of conversion of biosolids, or the processes are not cost effect given the commercial value of Class A biosolids. As a result there is much room for improvement in the recover of biosolids for beneficial uses.

Furthermore, the problems associated with biosolids are not unique. Many other types of wet material that result from industrial processing also fall into the category of products that may breakdown into products capable of beneficial use subject to the restriction of commercially viable methods of processing the wet material. These materials include, without limitation, calcium carbonate, calcium sulfate, mycelium, coal fines, lime sludge, paper sludge, compost, saw dust, animal waste, including manure, or any other material in need of drying and/or reduction.

Thus, a need exists for an improved apparatus and method of processing these types of wet materials.

SUMMARY OF THE INVENTION

An object of the present invention comprises providing an improved apparatus and method for processing wet material.

These and other objects of the present invention will become apparent to those skilled in the art upon reference to the following specification, drawings, and claims.

The present invention intends to overcome the difficulties encountered heretofore. To that end, a waste treatment apparatus for the treatment and processing of wet material is provided. The apparatus comprises an inlet hopper adapted for receipt of the wet material. A pre-conditioning unit is provided having an input and an output end wherein the wet material is received from the inlet hopper at the input end and is conveyed to the output end wherein the wet material is processed to reduce moisture and pathogen content. A blower is provided for providing a forced air stream to direct the flow of the wet material and for directing the flow from the output end of the pre-conditioning unit. A pre-separation cyclone is provided and is operatively positioned for receiving the wet material from the output end of the pre-conditioning unit via the air stream powered by the blower, wherein the wet material is processed under the influence of cyclonic forces that further reduce the moisture content, pathogen content, and reduce the particle size of the wet material. A separation cyclone is provided and is operatively positioned for receiving the wet material from the pre-separation cyclone via the air stream powered by the blower, wherein the wet material is processed under the influence of cyclonic forces that separate the wet material into a substantially dry portion that exits from a lower portion of the separation cyclone and a substantially liquid or vapor portion that exits from an upper portion of the separation cyclone. A wet scrubber is provided and is operatively positioned for receiving the substantially liquid portion of the wet material.

DETAILED DESCRIPTION OF THE INVENTION

Figure 1:
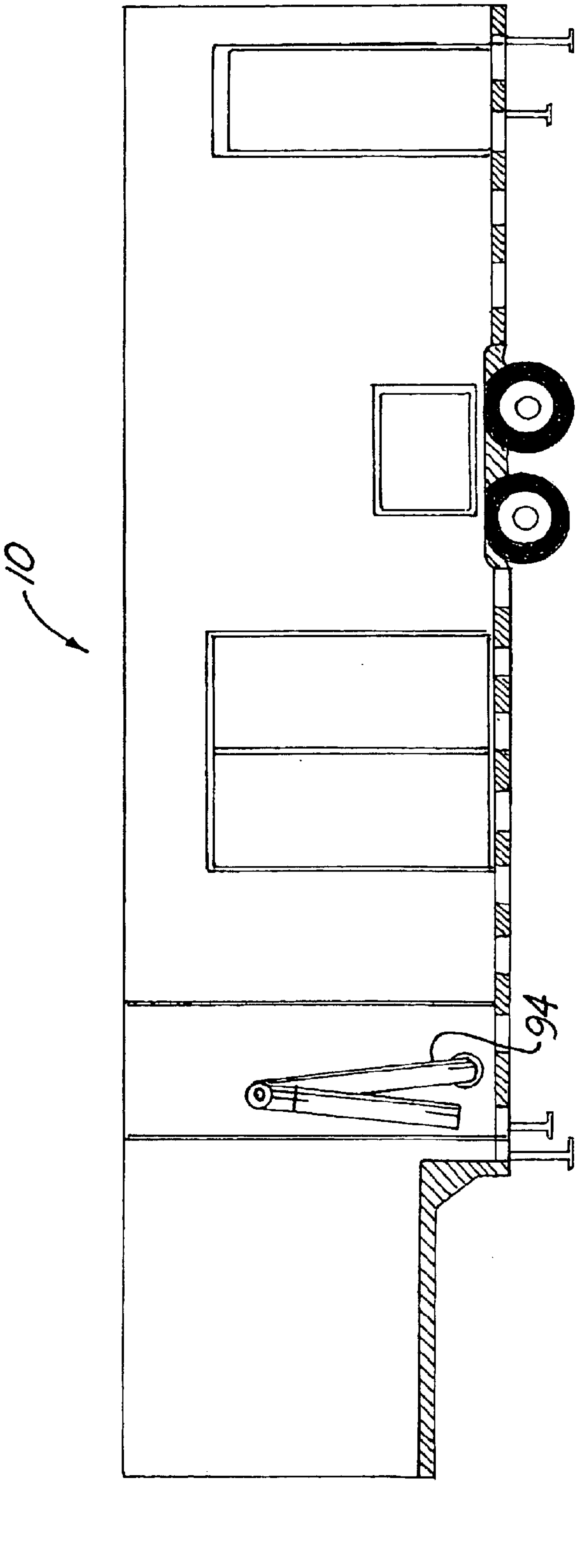
FIG. 1 is a side view of a mobile apparatus for the treatment of wet material.

In the Figures, FIG. 1 shows a mobile apparatus 10 for the treatment of wet material. The apparatus 10 is adapted for treatment of a wide variety of wet material including, without limitation, calcium carbonate, calcium sulfate, mycelium, coal fumes, lime sludge, paper sludge, compost, saw dust, animal waste, including manure, or any material in need of drying and/or reduction. The apparatus 10 is also adapted for processing of biosolids, and preferably for converting biosolids into a Class A product, but also into a Class B product.

Figure 2:
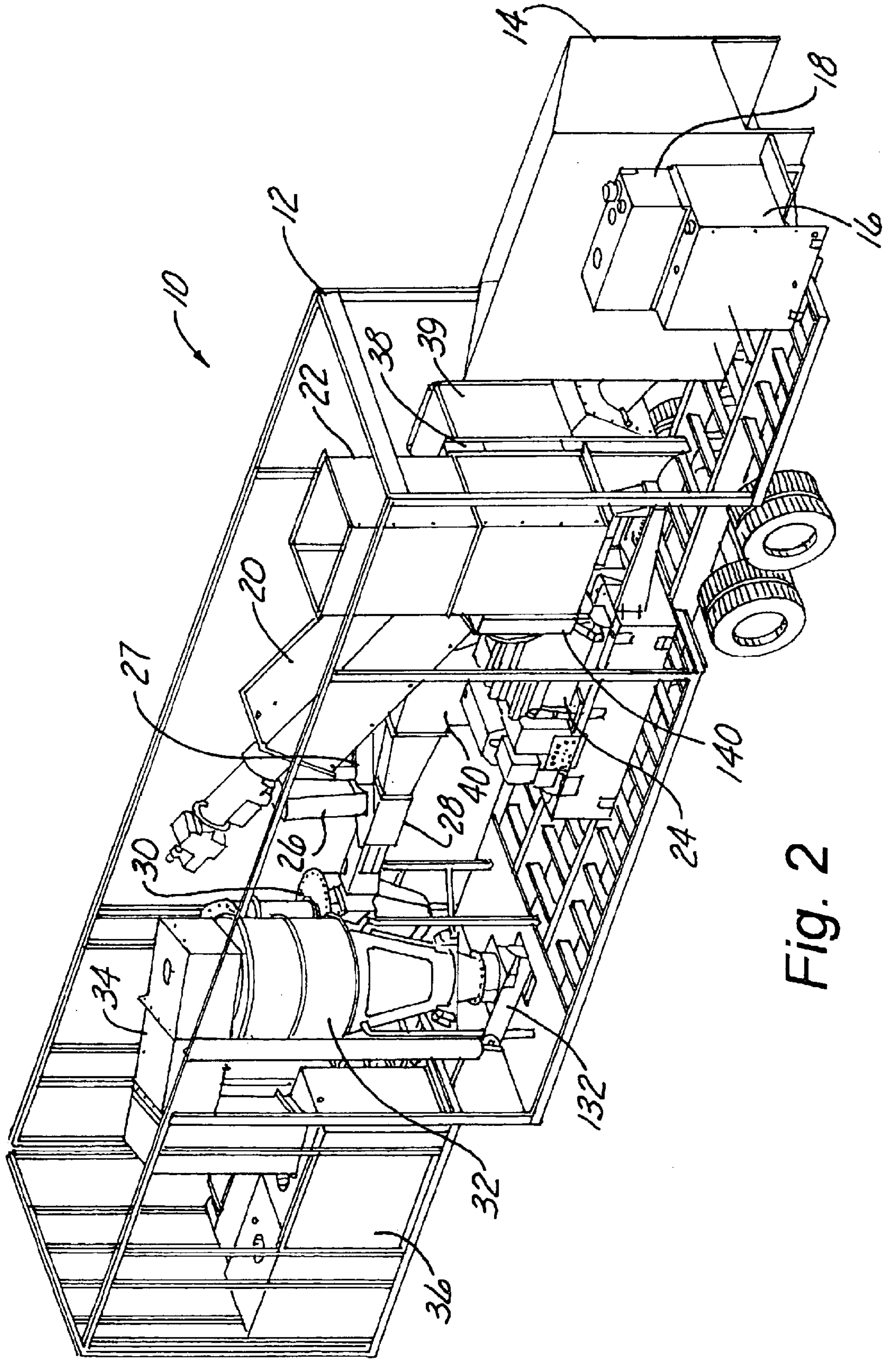
FIG. 2 is a perspective view of the apparatus with the outer paneling removed.
Figure 3:
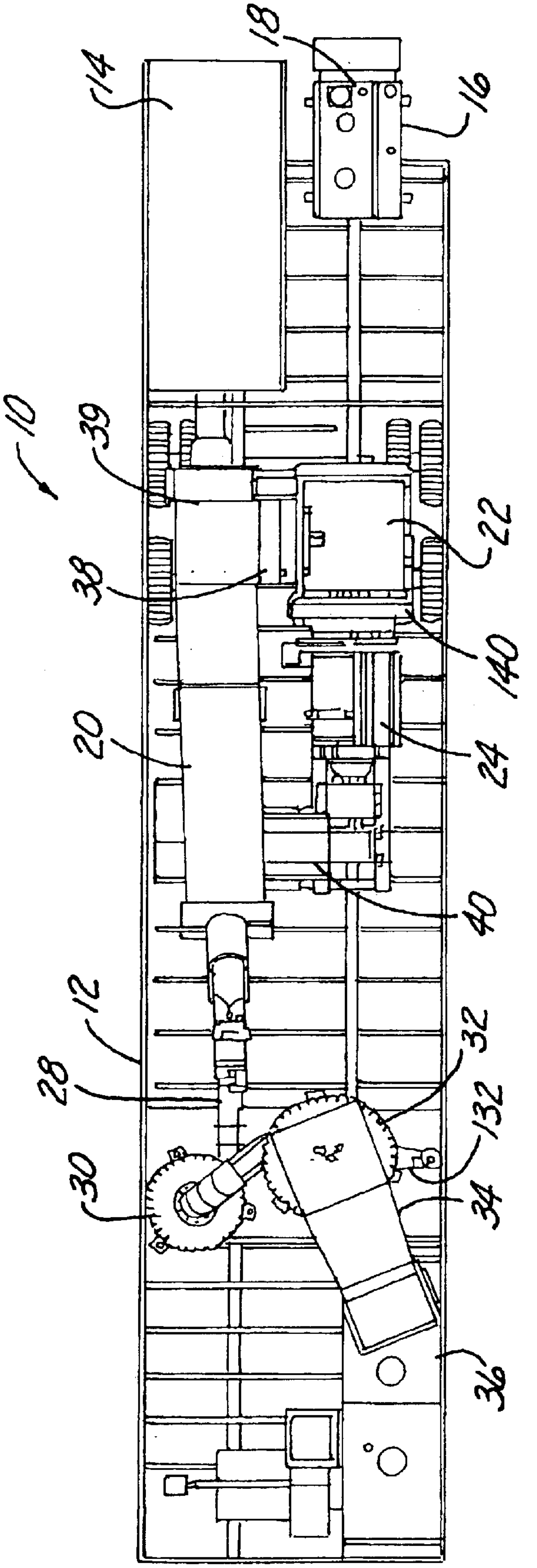
FIG. 3 is a top view of the apparatus shown in FIG. 2.
Figure 4C:
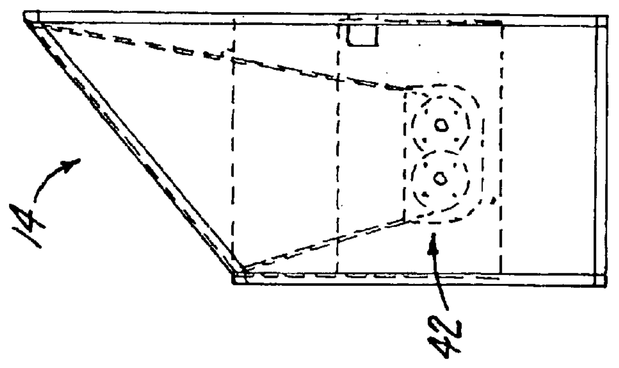
FIG. 4*c* is an opposite end view of the components of the apparatus shown in FIG. 4*a*.
Figure 4B:
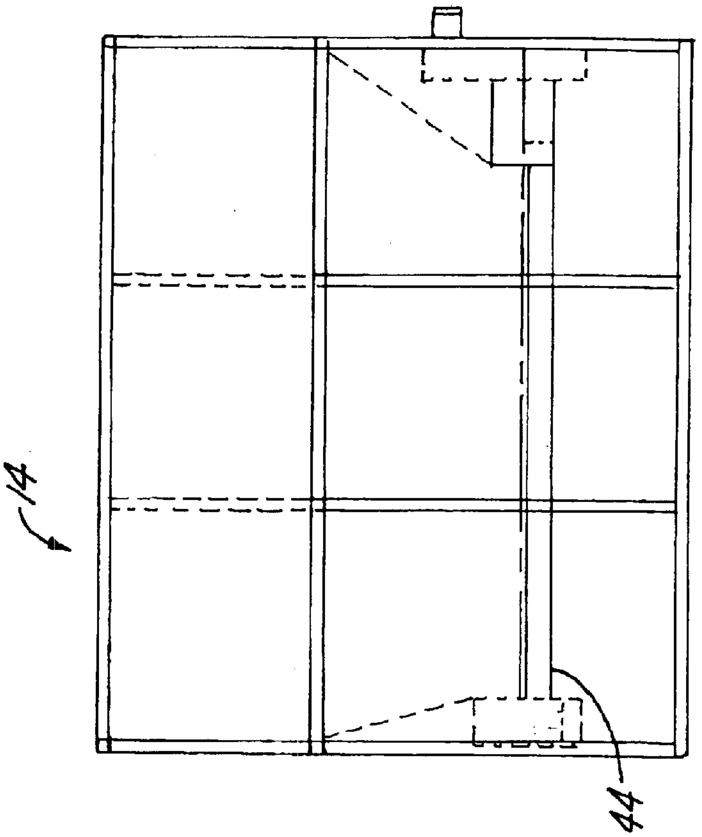
FIG. 4*b* is a side view of the components of the apparatus shown in FIG. 4*a*.
Figure 4A:
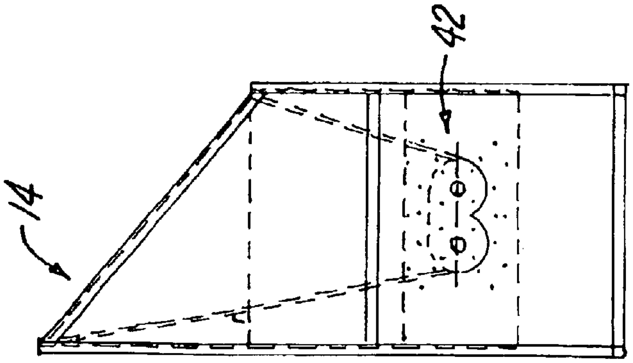
FIG. 4*a* is an end view of an inlet hopper, augers, and auger drive of the apparatus.
Figure 5:
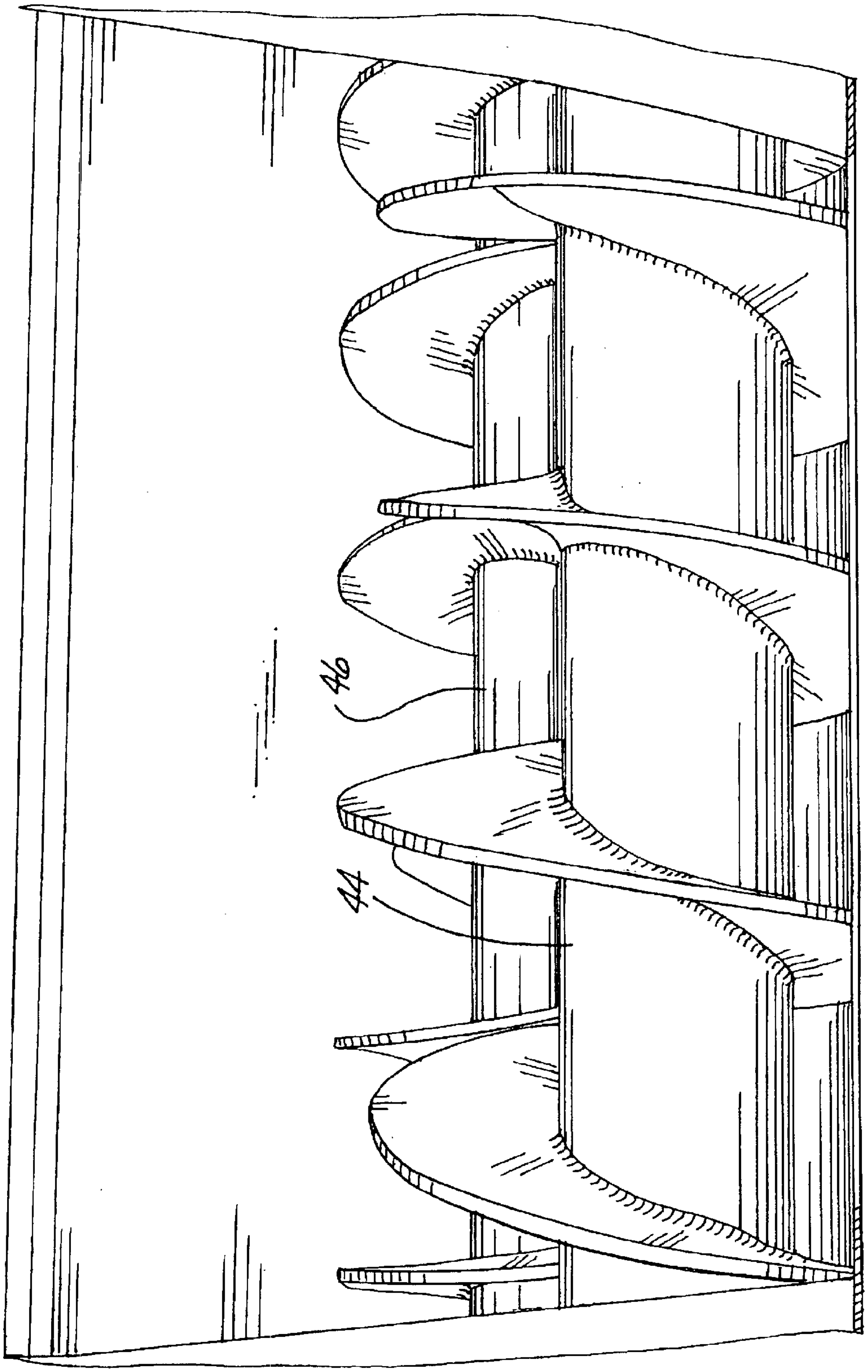
FIG. 5 is a perspective view of the inlet hopper augers.
Figures 6A, 6B, 6C, 6D:
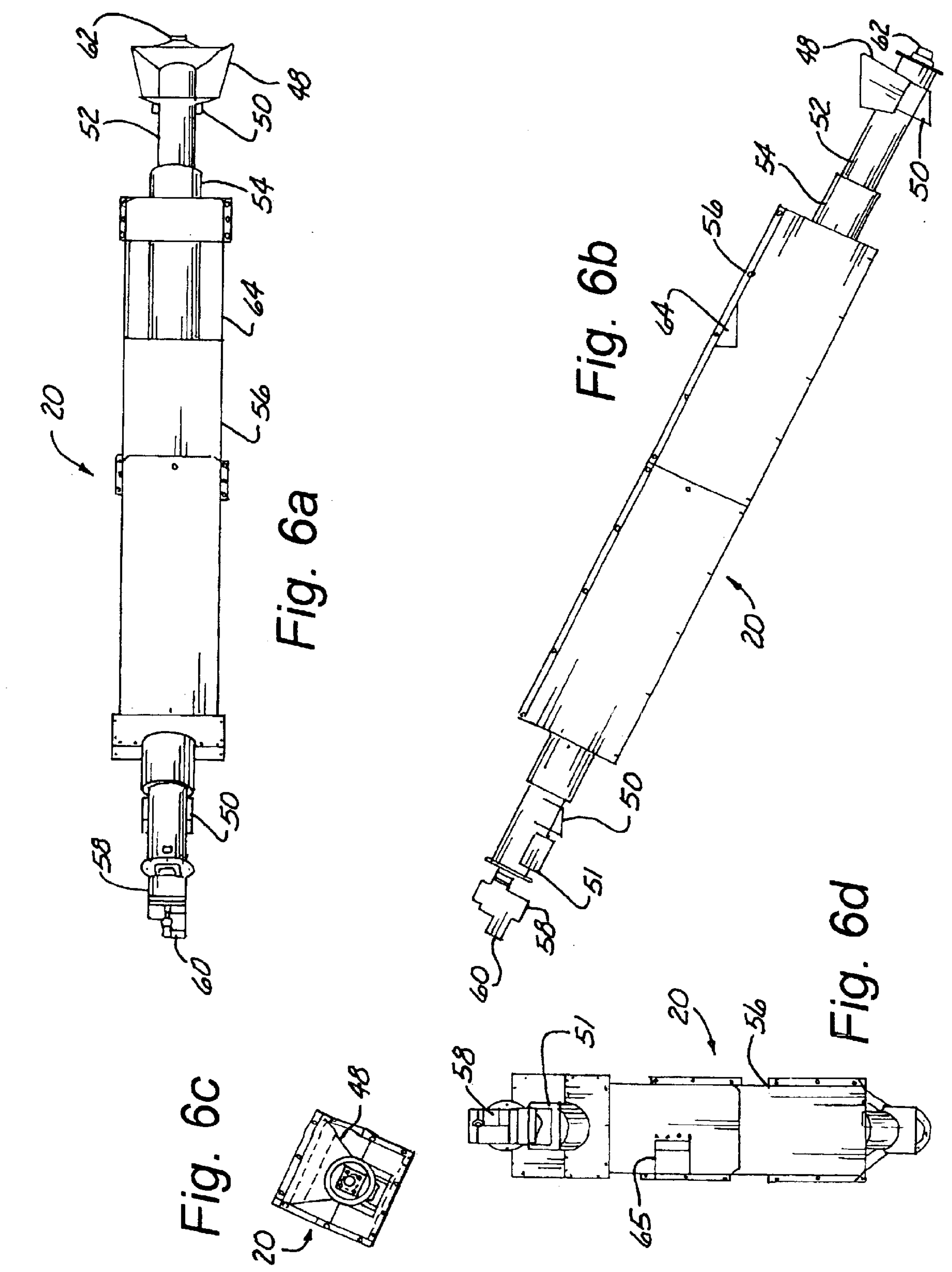
FIG. 6*a* is a top view of a pre-conditioning unit of the apparatus.
FIG. 6*b* is a side view of the pre-conditioning unit.
FIG. 6*c* is an end view of the pre-conditioning unit.
FIG. 6*d* is bottom view of the pre-conditioning unit.

As shown in FIG. 1, the apparatus 10 is fully enclosed behind a plurality of panels secured to a frame 12, and is built upon a wheeled trailer bed to allow for connection of the apparatus 10 to a semi-tractor (not shown) or other similar device for remote transportation to a working site. As shown in FIGS. 2–3, the apparatus includes a plurality of main processing components that will be described in detail hereinbelow, these include an inlet hopper 14 for receipt of the wet material (not shown), a diesel fuel tank 16 that provides fuel to a diesel engine 24 that powers the apparatus 10, a hydraulic reservoir 18 for use with the various hydraulic systems of the apparatus 10, a pre-conditioning unit 20 for initial treatment (or processing) of the wet material, an air inlet plenum 22 for drawing air into the apparatus 10 for use in treatment of the wet material and for cooling some of the components of the apparatus 10, a radiator 38 for transferring heat from an engine 24 to the incoming air stream, a grinder/air lock 26 for receipt of the wet material from the pre-conditioning unit 20, a feed-through housing 28 that receives the wet material from the grinder/air lock 26 and through which the wet material is transferred to a first cyclone 30 for pre-separation treatment, a second cyclone 32 for separation of the wet material into a substantially dry portion and a substantially liquid (or vapor) portion, an air discharge housing 34 for transferring the substantially liquid component of the wet material to a wet scrubber 36, a discharge auger 132 for output of the substantially dry portion of the wet material, and a blower 40 that provides air flow to move the wet material through the apparatus 10 and to provide the cyclonic air flow used in the first and second cyclones 30, 32.

FIGS. 4*a–c* and 5 show in detail the inlet hopper 14 is designed for a capacity of about 3.5 cubic yards of wet material. Of course, those of ordinary skill in the art will understand that the exact amount of wet material fed into the apparatus 10 can and will vary depending on the nature of the wet material and the desired consistency of the output. The inlet hopper 14 includes a dual axle auger comprised of an auger drive 42 and a first and second flighted auger shafts 44, 46 (see FIG. 5) that can rapidly move the wet material fed into the inlet hopper 14 into the apparatus 10, and in particular into the pre-conditioning unit 20.

Figure 8:
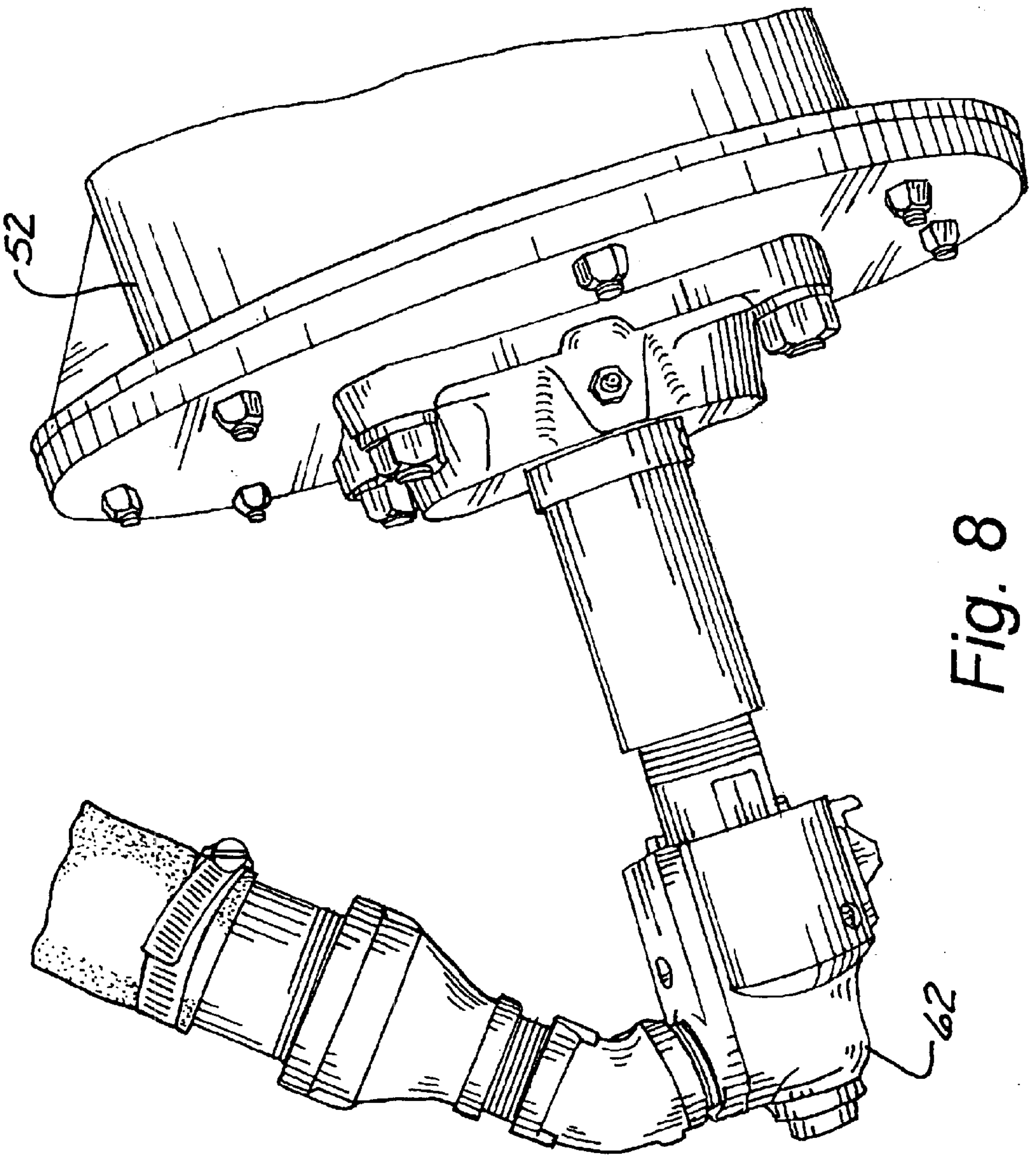
FIG. 8 is a side view of a diesel coolant inlet into a first end of the pre-conditioning unit shown in FIG. 6*c*.
Figure 9:
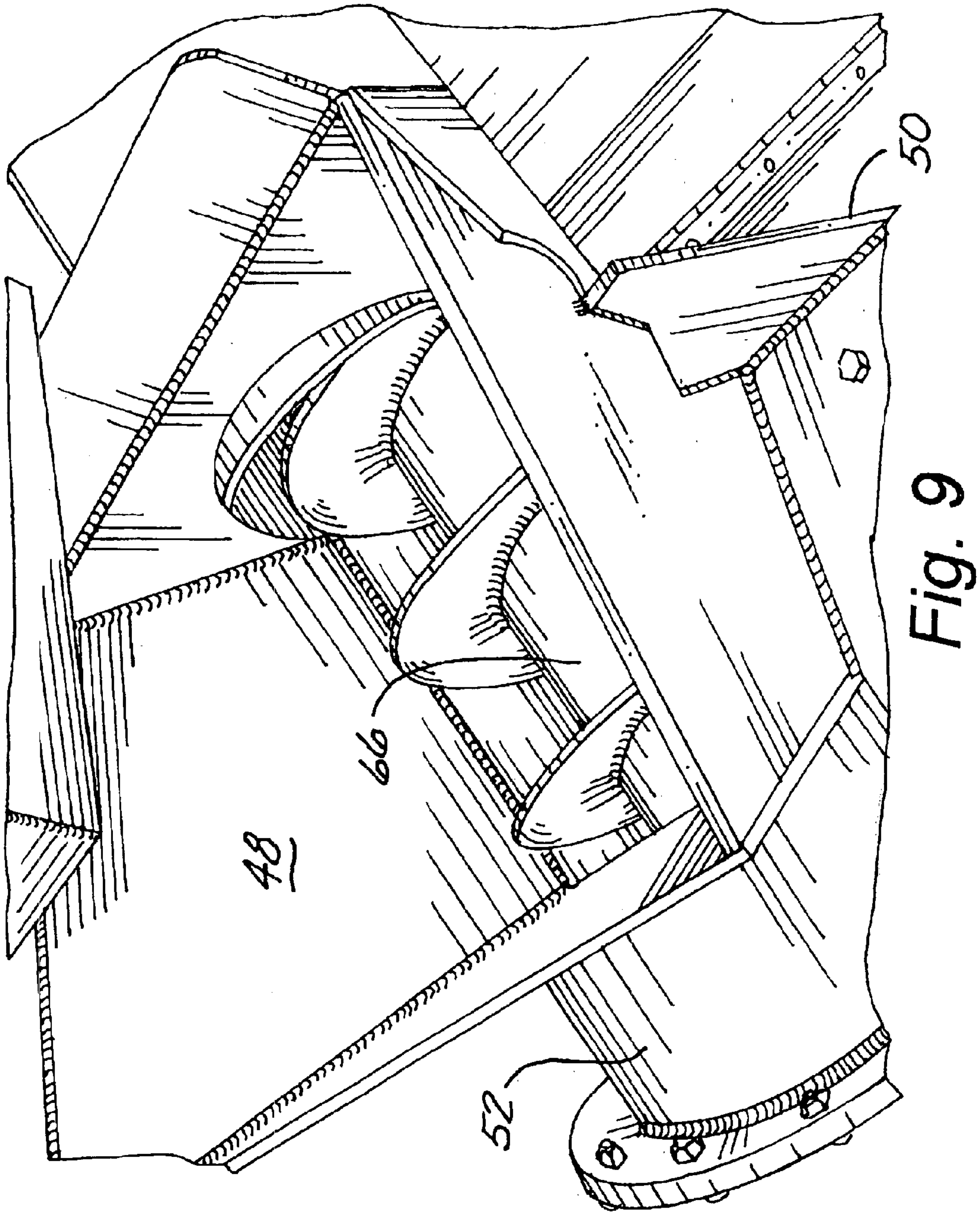
FIG. 9 is a perspective view of an intake hopper of the pre-conditioning unit.
Figure 11:
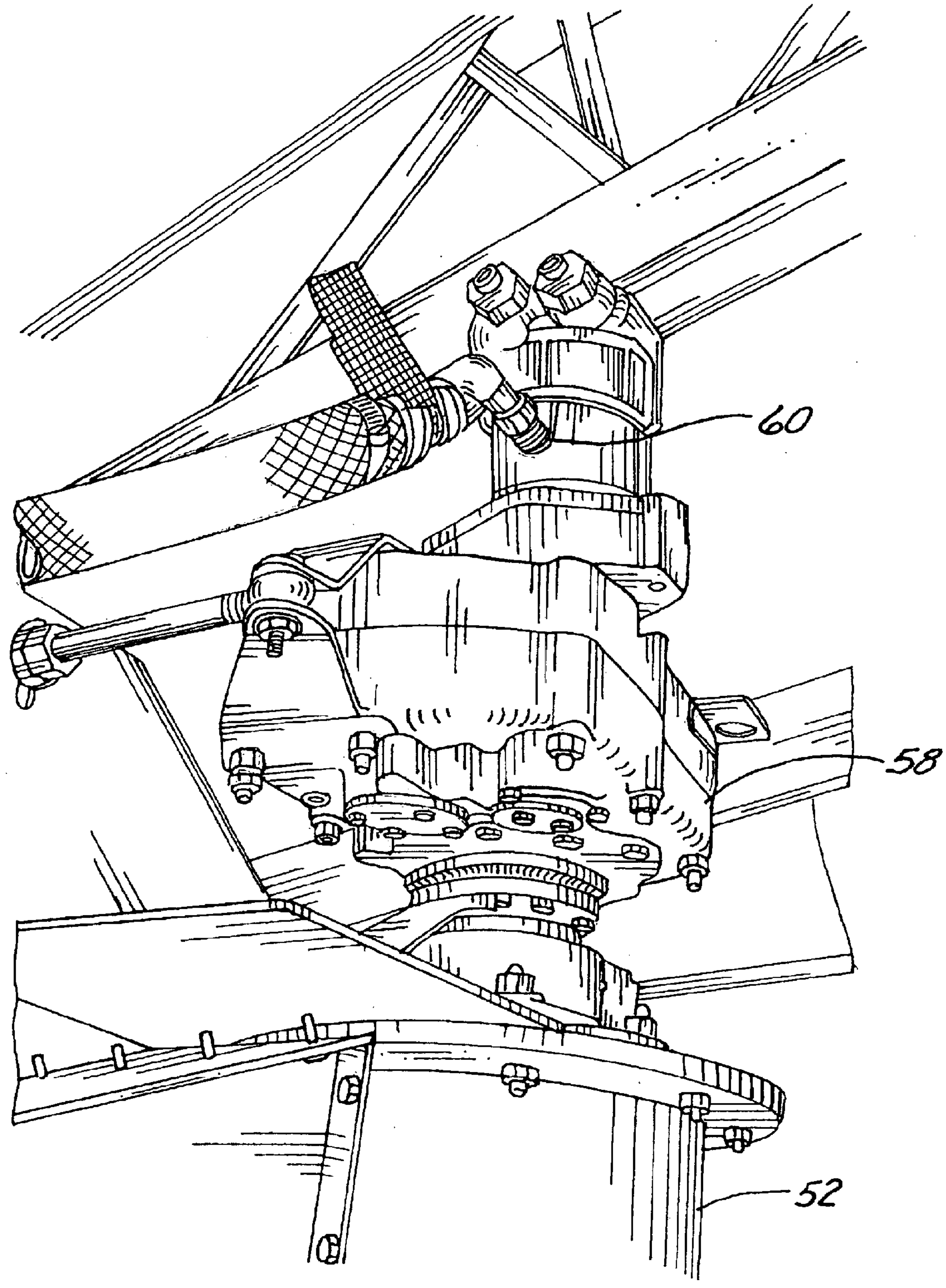
FIG. 11 is a perspective view of an auger drive motor and diesel coolant outlet located at a second end of the pre-conditioning unit.

FIGS. 6*a–d,* 7*a–b,* and 8–11 show in detail the pre-conditioning unit 20. The pre-conditioning unit 20 rests upon support feet 50 and is oriented at an angle to conserve space and to accommodate the loading and unloading of the wet material. The pre-conditioning unit 20 includes an intake hopper 48, located at an inlet end of the pre-conditioning unit 20, for receipt of the wet material from the auger driven inlet hopper 14. The wet material exits that pre-conditioning unit 20 through outlet 51 located at the bottom of the unit 20 and at an outlet end thereof. A flighted pre-conditioning auger 66 moves the wet material through the pre-conditioning unit 20 under the power of an auger drive motor 58 located at an output end of the pre-conditioning unit 20. The pre-conditioning auger 66 is contained within an auger shell 52, which is subject to various heat sources designed to raise the temperature of the wet material inside the auger shell 52 to a sufficient level to begin killing pathogens in the wet material. In particular, the pre-conditioning auger 66 has a hollow core designed to accept diesel coolant from the engine 24. The coolant enters the core of the pre-conditioning auger 66 through coolant hose 76 (see FIG. 11) and coolant inlet fixture 60 located at the output end of the pre-conditioning unit 20. The coolant exits the core of the pre-conditioning auger 66 at the input end of the pre-conditioning unit 20 through coolant output fixture 62 and travels through coolant hose 74 back to the diesel engine 24 (see FIG. 8). In this manner, engine waste heat is captured and transferred to the coolant and is in turn transferred to the pre-conditioning auger 66, and in particular to the flights of the auger 66, and then to the wet material. In the preferred embodiment of the invention the pre-conditioning auger 66 has over 75 ft. of exposed fin surface area for direct transfer of heat to the wet material. The heat from the coolant is transferred to the wet material and begins the process of pathogen reduction, aids in drying the wet material, and helps to softening the wet material to facilitate further processing by the cyclones 30, 32. Under normal operating conditions, the coolant enters the pre-conditioning unit 20 in excess of 195° F. and exits at less than 170° F. thereby transferring to the wet material a delta heat exchange of at least 25° F.

Figure 7A:
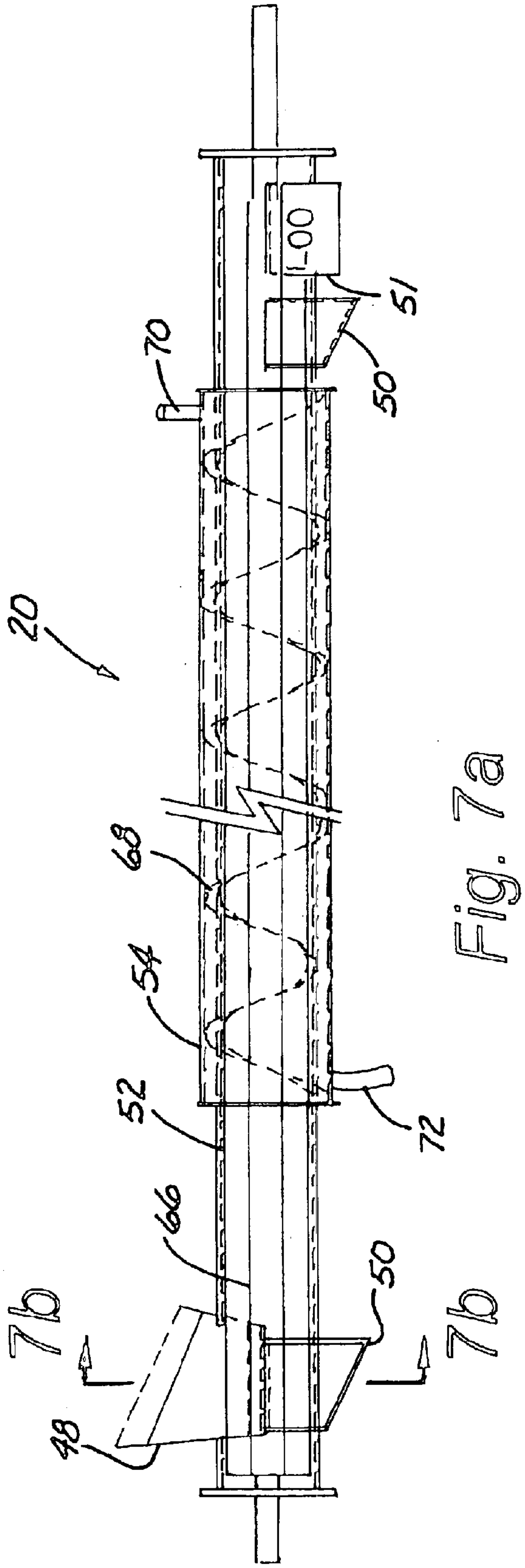
FIG. 7*a* is a side cross-sectional view of the pre-conditioning unit.
Figure 7B:
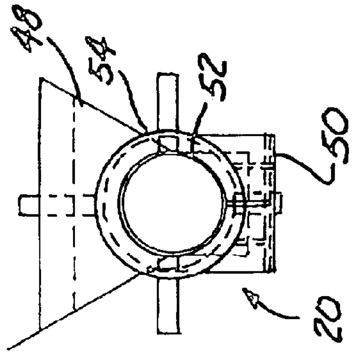
FIG. 7*b* is an end cross-sectional view of the pre-conditioning unit taken along the line b—b shown in FIG. 7*a*.
Figure 10:
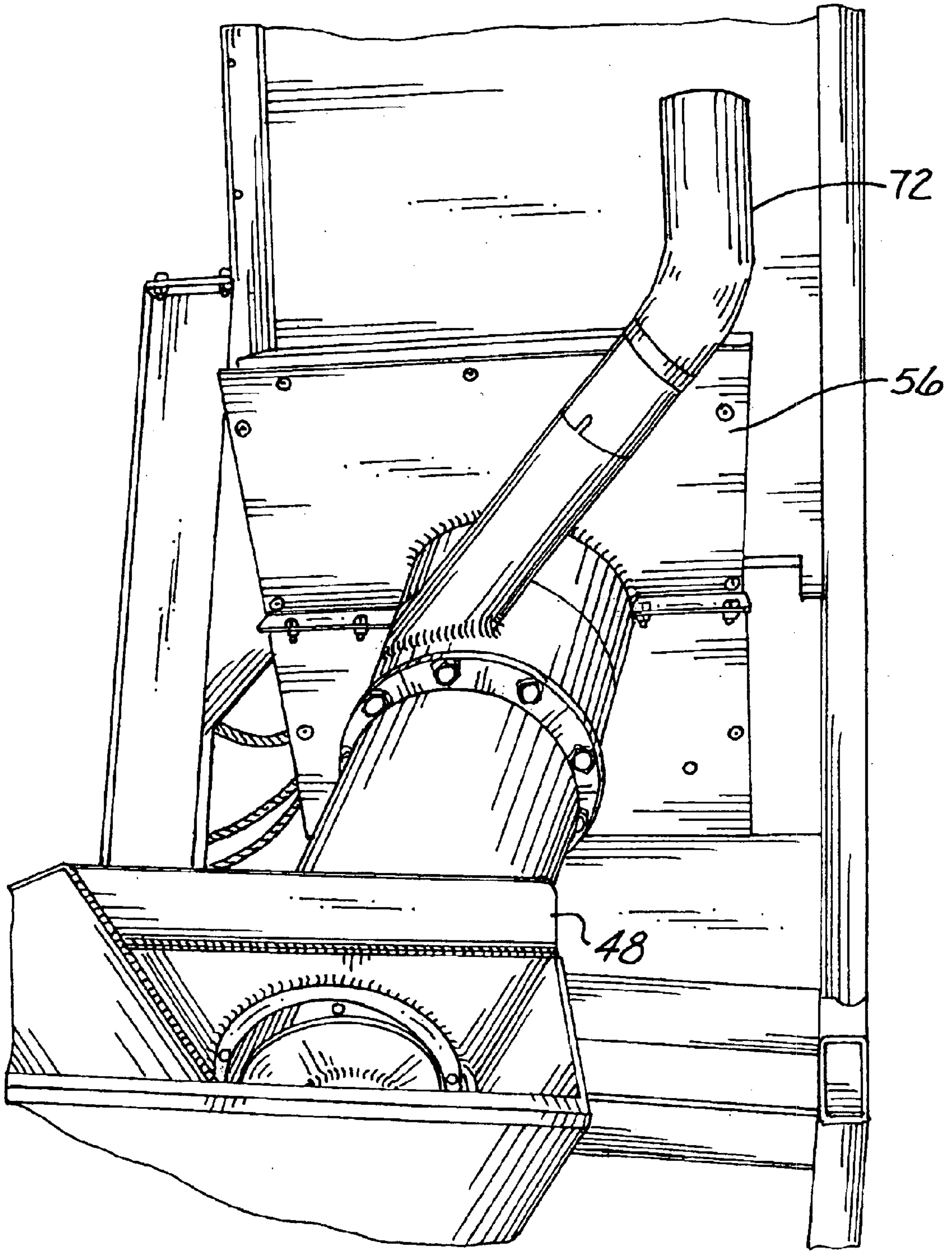
FIG. 10 is a perspective view of a portion of the pre-conditioning unit adjacent to the intake hopper.

Further waste heat from the diesel engine 24 is captured by channeling the exhausted from the diesel engine 24 to the pre-conditioning auger 20. Shown best in FIGS. 7 and 10, the auger shell 52 is surrounded by a helical shell 54 that contains a helix 68. Exhaust from the diesel engine 24 flows into the helical shell 54 through an inlet 70, and exits the helical shell 54 at an outlet 72 at the opposite end of the helical shell 54 from the inlet 70. The heat from the diesel engine 24 exhaust is channeled through the coils of the helix 68 wherein the helix 68 assists in absorbing the heat and subsequent transfer of the heat to the wet material within the auger shell 52. To further facilitate heat transfer the exhaust flows through the pre-conditioning auger 20 in a direction opposite to the direction of flow of the wet material. In the preferred embodiment of the invention the diesel exhaust enters the helical shell 54 at a temperature of about 500° F., and exits at a temperature of about 190° F.

Still further waste heat from the diesel engine 24 is captured for subsequent transfer to the wet material by directing waste heat from the diesel engine 24 into a heater box 56, or exhaust plenum extension, which surrounds the pre-conditioning auger 20 (see FIGS. 6*a–d,* and 11). Inlet air is introduced into the mobile apparatus 10 through an air plenum 22 (see FIGS. 2–3). The air is then exposed to a radiator 38 that is in operative communication with the diesel engine 24. The inlet air is used to cool the diesel engine 24 as it is forced through the radiator 38. The heated air is then channeled through a pre-heater duct 39 and into the heater box 56 that surrounds the helical shell 54. The pre-heated inlet air enters the heater box 56 through a pre-heated air opening 64 in the top of the heater box 56 located near the inlet end of the pre-conditioning auger 20. A series of helical fins (not shown) that conform to the shape of the heater box 56 surround the helical shell 54 and channel the air from the pre-heated air opening 54 to the pre-heated air outlet 65 located at the bottom of the heater box 56 near the outlet end of the pre-conditioning auger 20. The pre-heated air then enters a feed through tube 27 from opening 65, and under the power of a blower 40 is further heat compressed to a temperature in the preferred embodiment of 140° F. The helical fins in the heater box 56 also assist in the transfer of heat from the pre-heated air into the helical shell 54 and ultimately to the wet material. Also located inside the air plenum 22 is a fan 140 used to cool the diesel engine 24. The fan 140 is triggered based on the temperature of the diesel engine 24 and channels a portion of the inlet air from the air plenum 22 to cool the engine 24.

Figure 12:
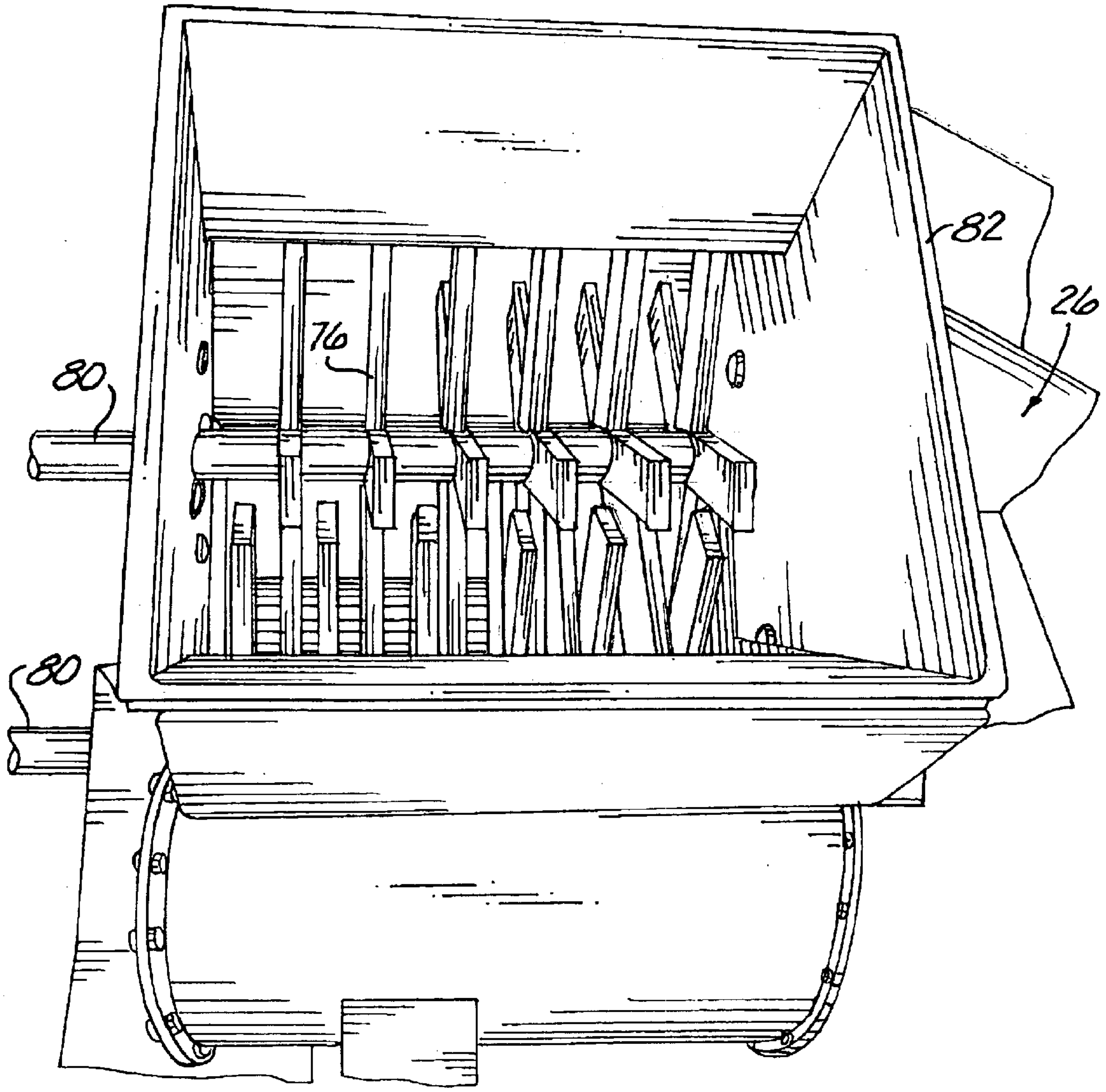
FIG. 12 is a perspective view of a grinder/air lock for receiving material from the pre-conditioning unit.
Figure 13:
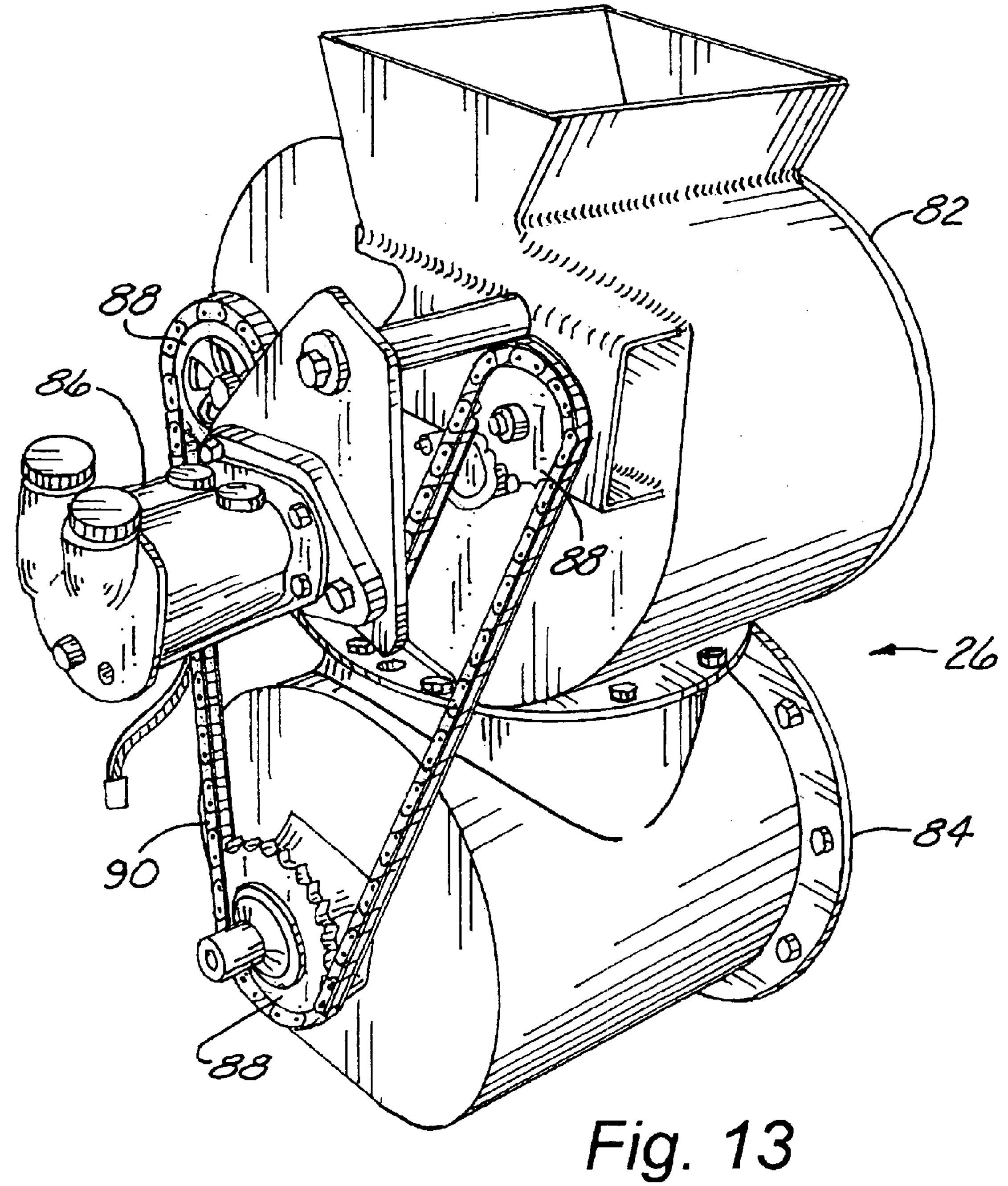
FIG. 13 is a perspective view of an alternative grinder/air lock
Figure 14:
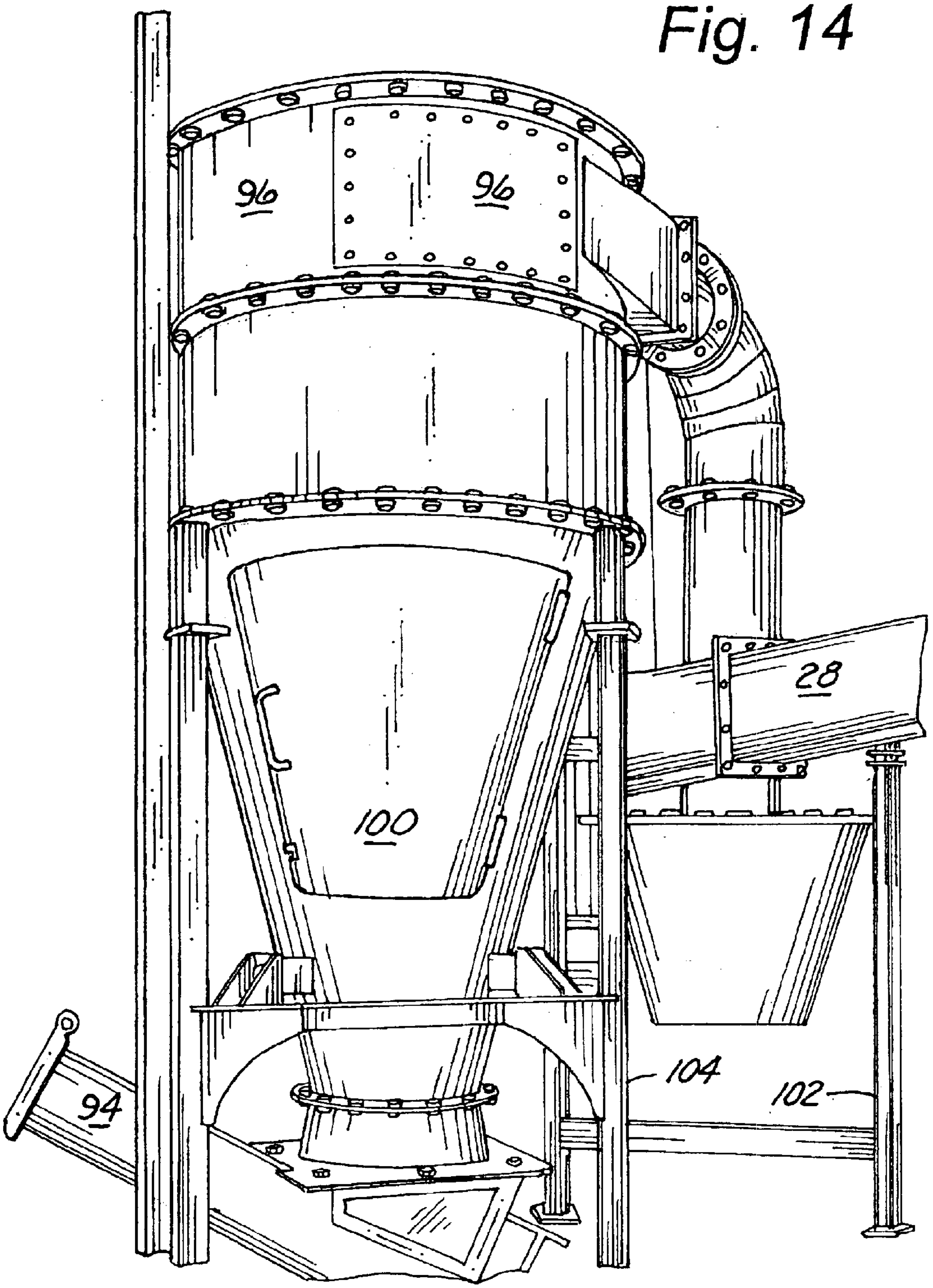
FIG. 14 is a perspective view of a first and second cyclone of the apparatus.
Figure 15:
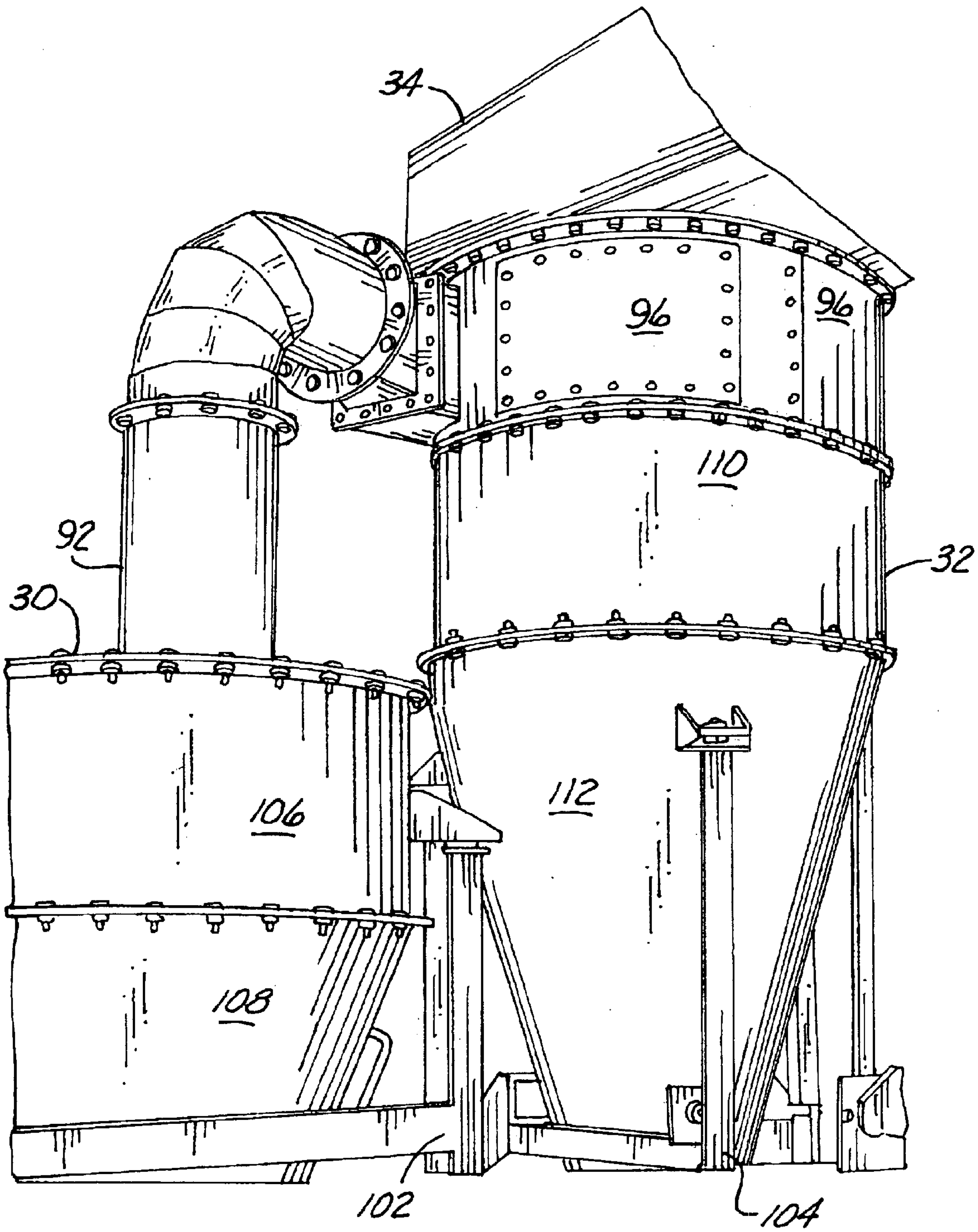
FIG. 15 is a perspective view of the first and second cyclone taken from the opposite side of the cyclones as depicted in FIG. 14.
Figures 16A, 16B, 16C, 16D:
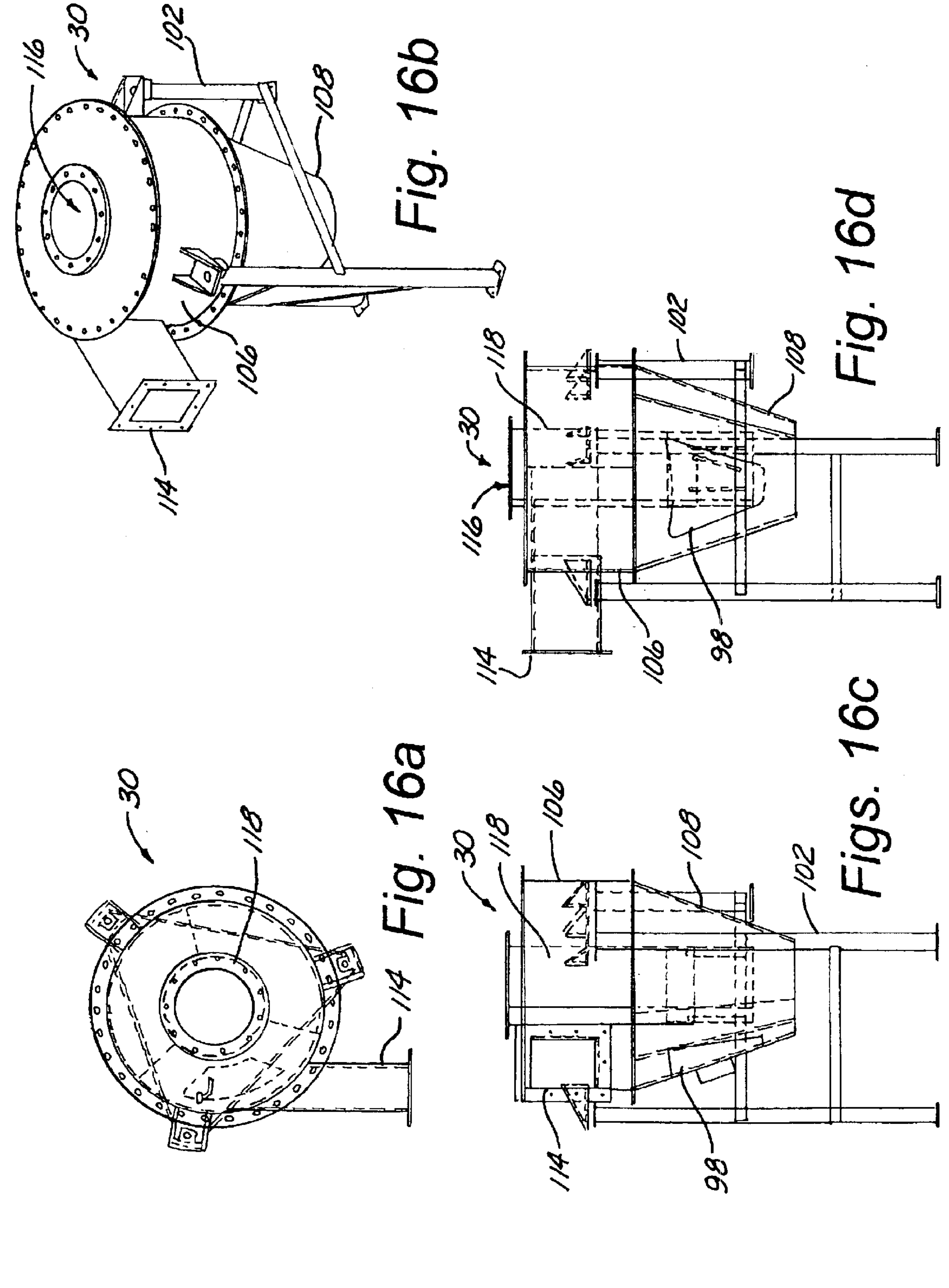
FIG. 16*a* is a top view of the first cyclone.
FIG. 16*b* is a perspective view of the first cyclone.
FIG. 16*c* is a side view of the first cyclone.
FIG. 16*d* is a side view of the first cyclone rotated 90 degrees in a clockwise direction from the view of the first cyclone as depicted in FIG. 16*c*.
Figure 17:
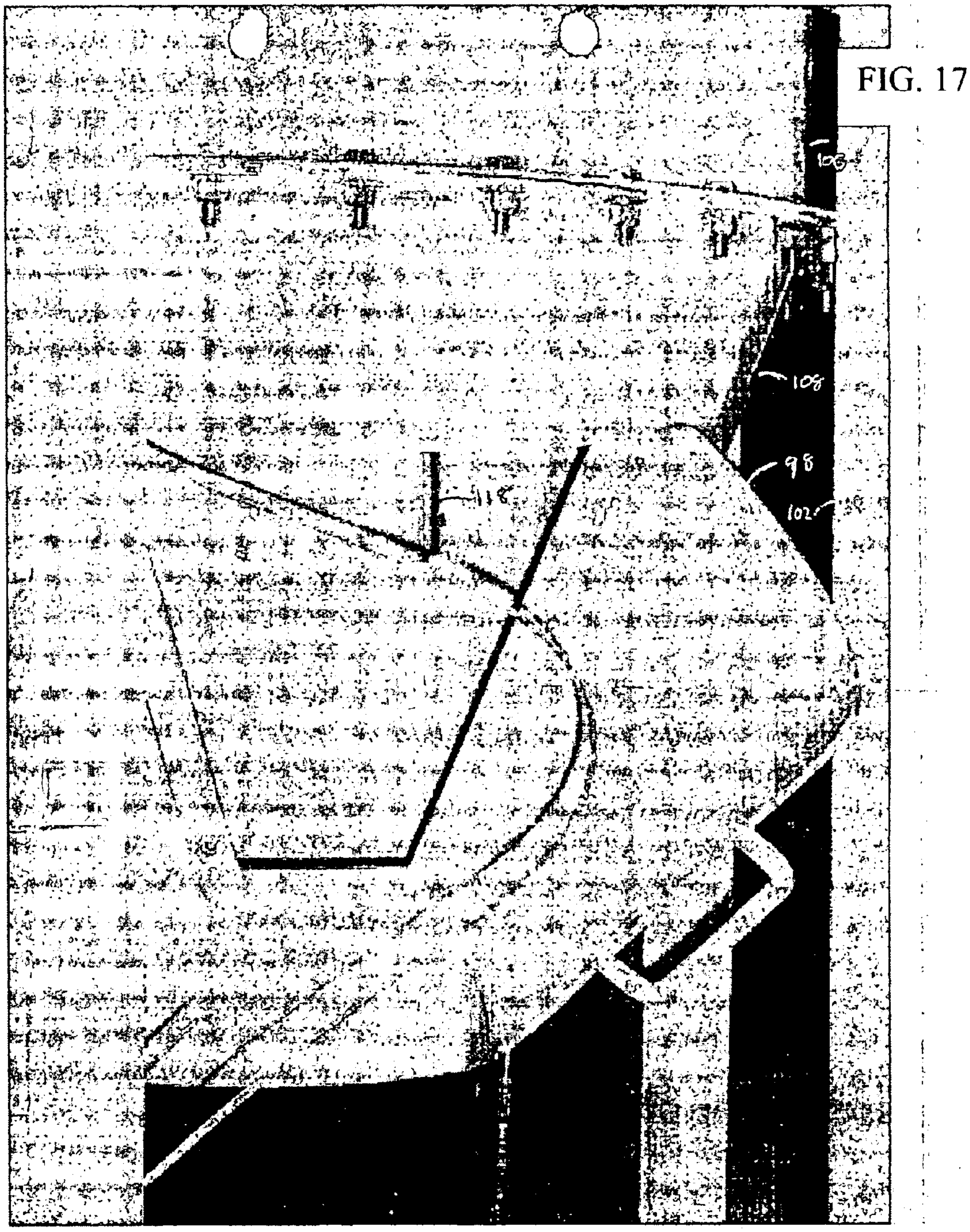
FIG. 17 is a perspective view of a lower portion of the first cyclone.
Figure 18:
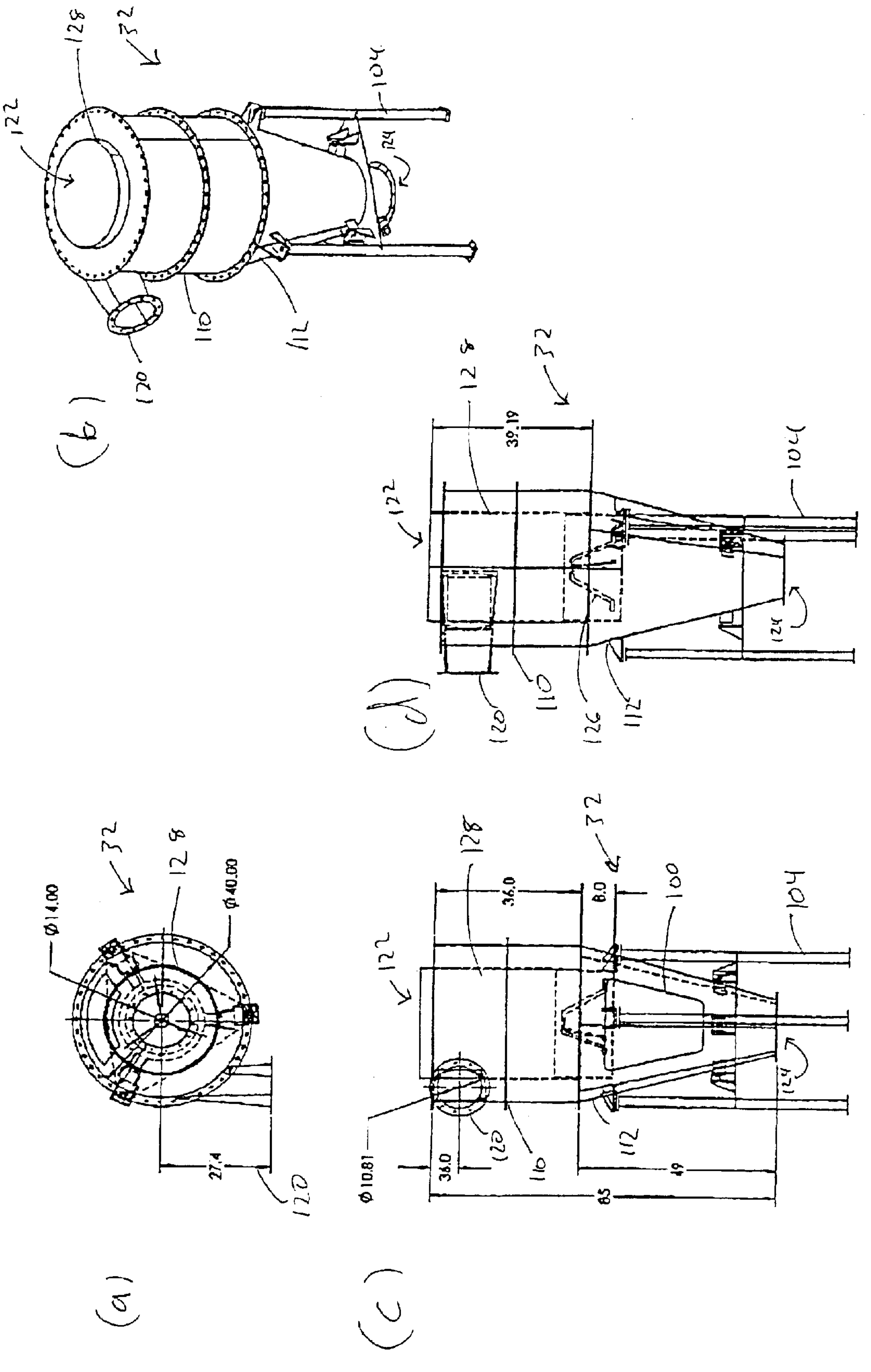
FIG. 18*a* is a top view of the second cyclone.
FIG. 18*b* is a perspective view of the second cyclone.
FIG. 18*c* is a side view of the second cyclone.
FIG. 18*d* is a side view of the second cyclone rotated 90 degrees in a clockwise direction from the view of the second cyclone as depicted in FIG. 18*c*.
Figure 19:
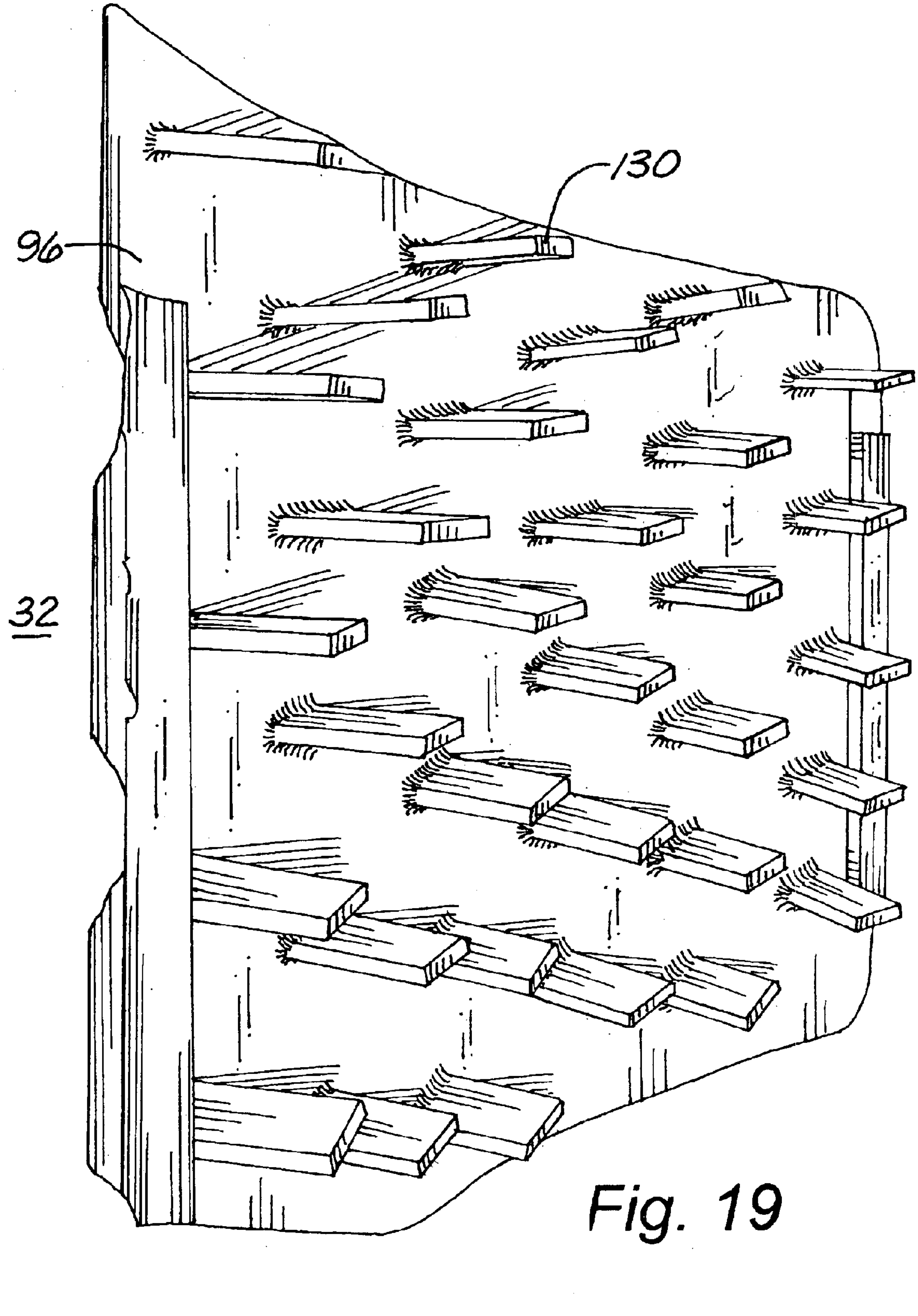
FIG. 19 is a perspective view of a shear plate and blades of the second cyclone shown from the inside of the second cyclone.
Figure 20:
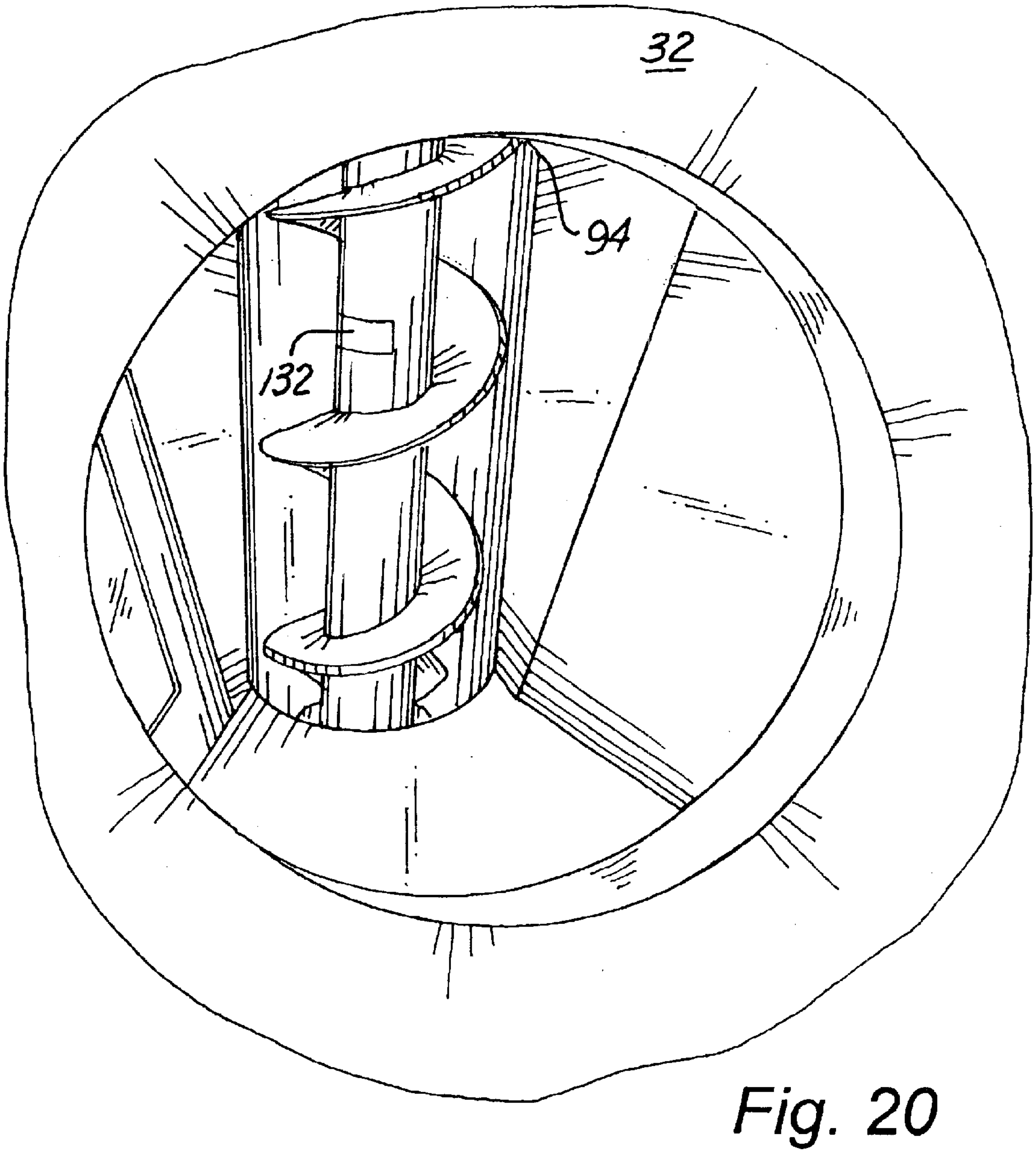
FIG. 20 is a top view of a discharge auger shown from inside the second cyclone.
Figure 21:
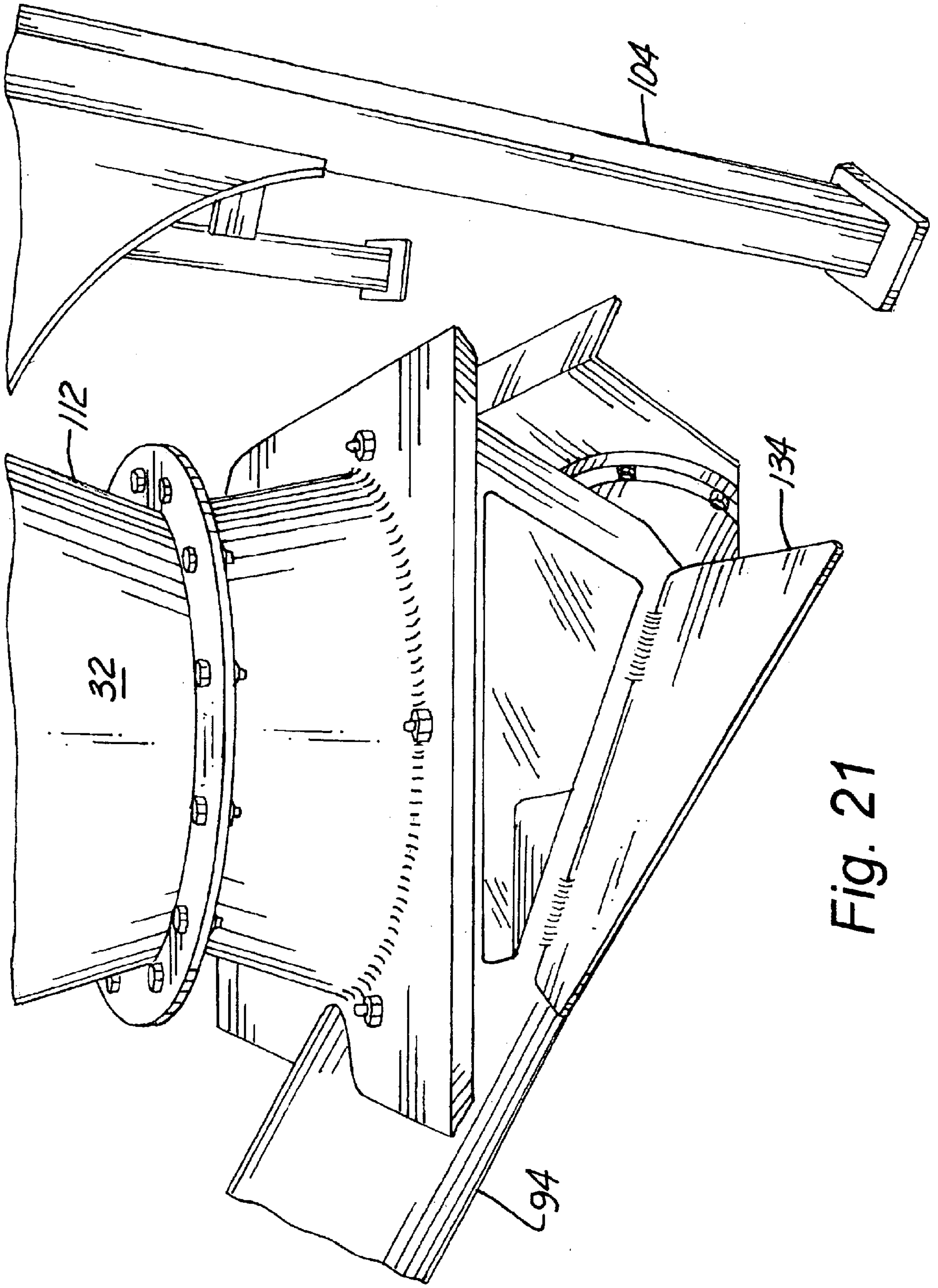
FIG. 21 is a side view of the discharge auger and a lower portion of the second cyclone.
Figure 22B:
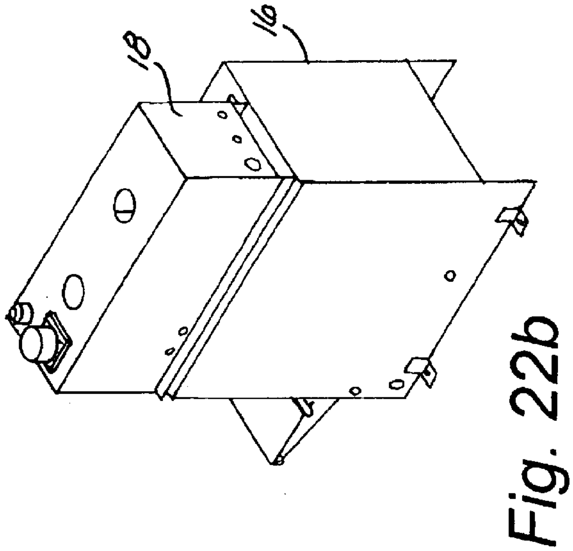
FIG. 22*b* is a perspective view of the hydraulic reservoir and diesel fuel tank.
Figure 22D:
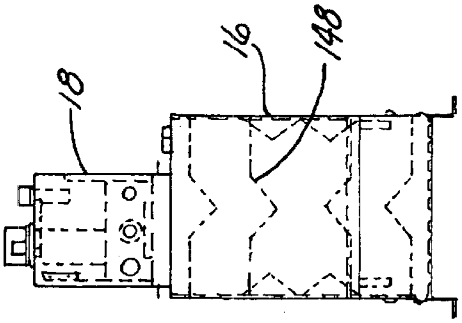
FIG. 22*d* is an end view of the hydraulic reservoir and diesel fuel tank.
Figure 22A:
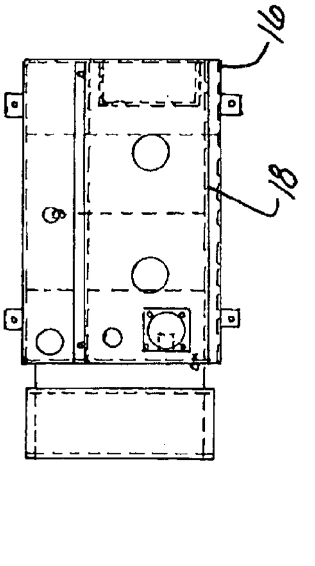
FIG. 22*a* is a top view of a hydraulic reservoir and diesel fuel tank of the apparatus.
Figure 22C:
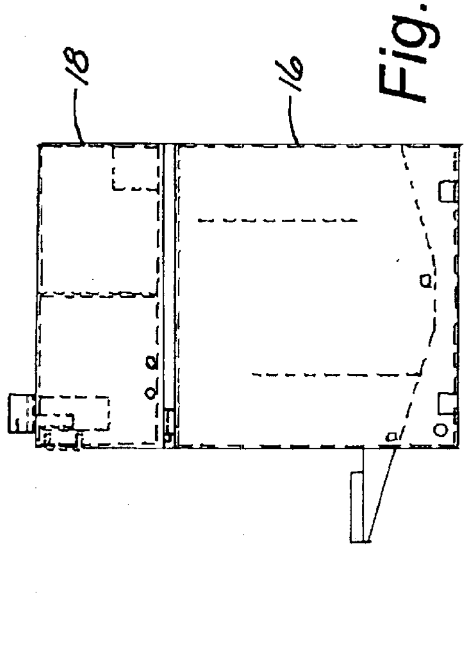
FIG. 22*c* is a side view of the hydraulic reservoir and diesel fuel tank.

After the wet material passes through the pre-conditioning unit 20 it enters the grinder/air lock assembly 26 (see FIGS. 12–13). The assembly 26 provides for additional reduction of the particle size of the wet material and for isolation of the high velocity heated air moving from the feed through housing 28 under the power of the blower 40 and into the first cyclone 30. FIGS. 12–13 show two embodiment of the grinder/air lock assembly 26. In both embodiments the grinder 82 consists of a plurality of beater bars 76 mounted to two a pair of beater bar shafts 80. The shafts 80 rotate under the power of a motor 86 in opposite directions to funnel the wet material into the center of the grinder 86. The impingement of the wet material on the beater bars 76 facilitates particle reduction and thereby reducing bridging of the material that could clog the grinder 82 and otherwise reduce the efficiency of operation of the apparatus 10. The embodiment of the grinder/air lock assembly 26 shown in FIG. 13 utilizes a plurality of gears 88 and a chain 90 driven by the motor 86 to rotate the beater bar shafts 80. However, those of ordinary skill in the art will understand that the motor can drive the shafts directly, or other similar drive means could be uses as well. In this manner, the grinder 82 uses counter-rotating intersection blades to shear or grind the wet material into small sized particles in the range of a half-inch in size to facilitate acceleration of the wet material upon introduction into the high velocity air stream after the wet material passes through the air lock 84. The air lock 84 is conventional and is also powered by the motor 86 to move the material from the grinder 82 into the high velocity air stream enclosed in the feed through 28.

After the wet material exits the air lock 84 it enters the feed through housing 28 and is exposed to pre-heated high velocity air flow that moves the wet material into the first cyclone 30, or pre-separation cyclone. In the preferred embodiment of the invention the air flow in the feed through housing 28 reaches the first cyclone inlet 114 at 325 feet/second. FIGS. 14–17 show the first cyclone 30. The first cyclone 30 includes a cyclone inlet 114 where the wet material enters the top of the cyclone 30. Inside the first cyclone 30 the wet material is further desiccated and separated under cyclonic forces of the heated blower air moving through the apparatus. The cyclonic action moves the wet material in a descending spiral about the exterior of the inside of the first cyclone 30, a column of air rises through the center of the exterior spiral from the bottom to the top of the first cyclone 30 and moves the wet material out of the first cyclone exit port 116. As the wet material circulates inside the first cyclone 30 it is size reduced by collision with the other circulating wet material in the cyclone, and the density of the material is reduced through desiccation from exposure to the heated air. Also, exposure to the heated air reduces pathogens. As the particle size of the wet material is reduced by separation and the weight of the material is reduced by desiccation, the wet material descends to the bottom of the first cyclone 30 and eventually reaches a size and density that allows it to be carried up and out of the first cyclone 30 as it is captured in the upward center draft of the cyclone.

The first cyclone 30 is constructed in two segments that are bolted together, the shape of the segments facilitates the cyclonic flow or air through the first cyclone 30. The upper segment 106 of the first cyclone 30 is cylindrical in shape with a fixed diameter. The lower segment 108 is a frustum, or truncated cone. The upper and lower segments 106, 108 both include matingly aligned flanges where the segments 106, 108 are bolted together. A core finder 118 is centrally located in the interior of the first cyclone 30, and terminates at its upper end at the exit port 116. The core finder 118 serves two purposes. First, the core finder 118 prevents the wet material from traveling straight from the inlet 114 to the exit port 116 without entering in the cyclonic flow. In other words, the core finder 118 extends downward from the top of the first cyclone to prevent a short circuit of the path of the wet material in the first cyclone 30. Additionally, the core finder 118 is vertically adjustable to affect the cyclonic flow inside the first cyclone 30, and in particular to prevent the accumulation of material at the bottom of the first cyclone 30. The vertical position of the core finder 118 will affect how far toward the bottom of the first cyclone 30 the outward spiral of air descends. If the core finder 118 is not positioned closed enough to the bottom of the first cyclone 30 the wet material may not reach a density and size to allow it to move upward into the rising central column of air that takes the wet material out of the first cyclone 30. The correct position of the core finder 118 will vary depending on processing requirements and the nature of the wet material, and can be determined through experimentation. The first cyclone 30 also includes a hatch 98 to allow for maintenance and cleaning as necessary. The first cyclone 30 rests on three support feet 102 that secure to the floor of the apparatus 10.

The partially processed wet material leaves the first cyclone 30 through the top of the first cyclone 30 and enters a material feed tube 92 where the wet material moves to the second cyclone 32 (see FIGS. 18–21). The second cyclone 32 is generally similar to the first cyclone 30 in that it includes an upper cylindrical segment 110 and a lower segment 112 that is a frustum. The upper and lower segments 110, 112 both include matingly aligned flanges where the segments 110, 112 are bolted together. In the preferred embodiment the upper segment 110 of the second cyclone 32 is comprised of two individual segments joined at a matingly aligned flange. Of course, those of ordinary skill in the art will understand that the specific orientation of the segments of cyclones 30, 32 can and will vary depending on processing requirements.

In a manner similar to the first cyclone 30, the wet material enters the second cyclone 32 tangentially through inlet pipe 120 and then enters the cyclonic flow within the second cyclone 32. In the preferred embodiment of the invention the inlet velocity into the second cyclone 32 is in excess of 300 feet per second. The upper segment 110 of the second cyclone 32 includes a plurality of shear panels 96 located about the circumference of the upper segment 110. The inside of the shear panels 96 include a plurality of blades 130 that project inward into the cyclonic flow of the wet material and mechanically shear the wet material to further size reduce the material. The second cyclone 32 also includes a core finder 128 that functionally operates in the same manner as the core finder 118 of the first cyclone 30. The core finder 128 is hydraulically adjusted through pistons 126. This allows the core finder 128 to be easily and precisely located in order to achieve the desired separation between a substantially dry and a substantially liquid portion of the wet material in the second cyclone 32. As opposed to the first cyclone 30, which is focused on desiccation and particle size reduction, the second cyclone 32 is a separation cyclone whereby the wet material under the influence of cyclonic forces is separated into a substantially dry and a substantially liquid portion through specific gravity separation. Pathogen reduction also takes place therein. The substantially dry portion leaves the second cyclone 32 through a lower exit 124, while the substantially liquid portion leaves the second cyclone 32 through an upper exit 122. The degree of separation is influenced to a large degree by the amount of time the material is exposed to the cyclonic forces within the second cyclone 32. Manipulation of the position of the core finder 128 affects this processing parameter, as well as other variables. Of course, those of ordinary skill in the art will understand that the exact position of the core finder 128 can and will vary depending on the type of wet material and the desired consistency of the final processed product. The second cyclone 32 includes a support frame 104 that terminates in three legs that secure to the floor of the apparatus. The second cyclone 32 also includes a hatch 100 for inside access and for clean out purposes if necessary.

As noted above, the substantially dry portion of the wet material exits that second cyclone through the lower exit 124 where it enters a discharge auger 132 that is surrounded by an auger shell 94 (FIGS. 1, 20, 21, and 27). The discharge auger 132 conveys the substantially dry portion of the processed wet material from the bottom of the second cyclone 32 to any convenient receptacle that is placed at the output end of the discharge auger and shell 132, 94 (seen best in FIG. 1). A discharge auger hatch 134 is provided at the input end of the auger and shell 132, 94 for clean out purposes. Additionally, the casing around the input end of the auger and shell 132, 94 and the bottom of the second cyclone 32 forms a vortex dissipater that maximizes the size of the second cyclone 32 and minimizes the overall height of the second cyclone 32. Alternatively, a remote feed tube (not shown) can be attached to the output end of the discharge auger and shell 132, 94 to extend the reach of the output of the substantially dry portion of the processed wet material. Hydraulic hook ups are provided to power the remote feed tube is needed.

The substantially liquid, or vapor, portion of the processed wet material exits the second cyclone 22 through the upper exit 122 of the second cyclone 32 and then enters a discharge plenum 34. The discharge plenum 34 transports the wet material to the wet scrubber 36 for additional processing. The wet scrubber 36 is of a type that is commercially available. Preferably, the wet scrubber 36 includes a blower capacity of 10,000 CFM, is hydraulically driven, and has a capacity on the order of 280 gallons of liquid. The wet scrubber 36 uses a fine mist/spray at the junction of the discharge plenum 34 and wet scrubber 36 inlet to remove any residual dust particles. The wet scrubber 36 also features continual water re-circulation and effluent filtration.

Figure 23:
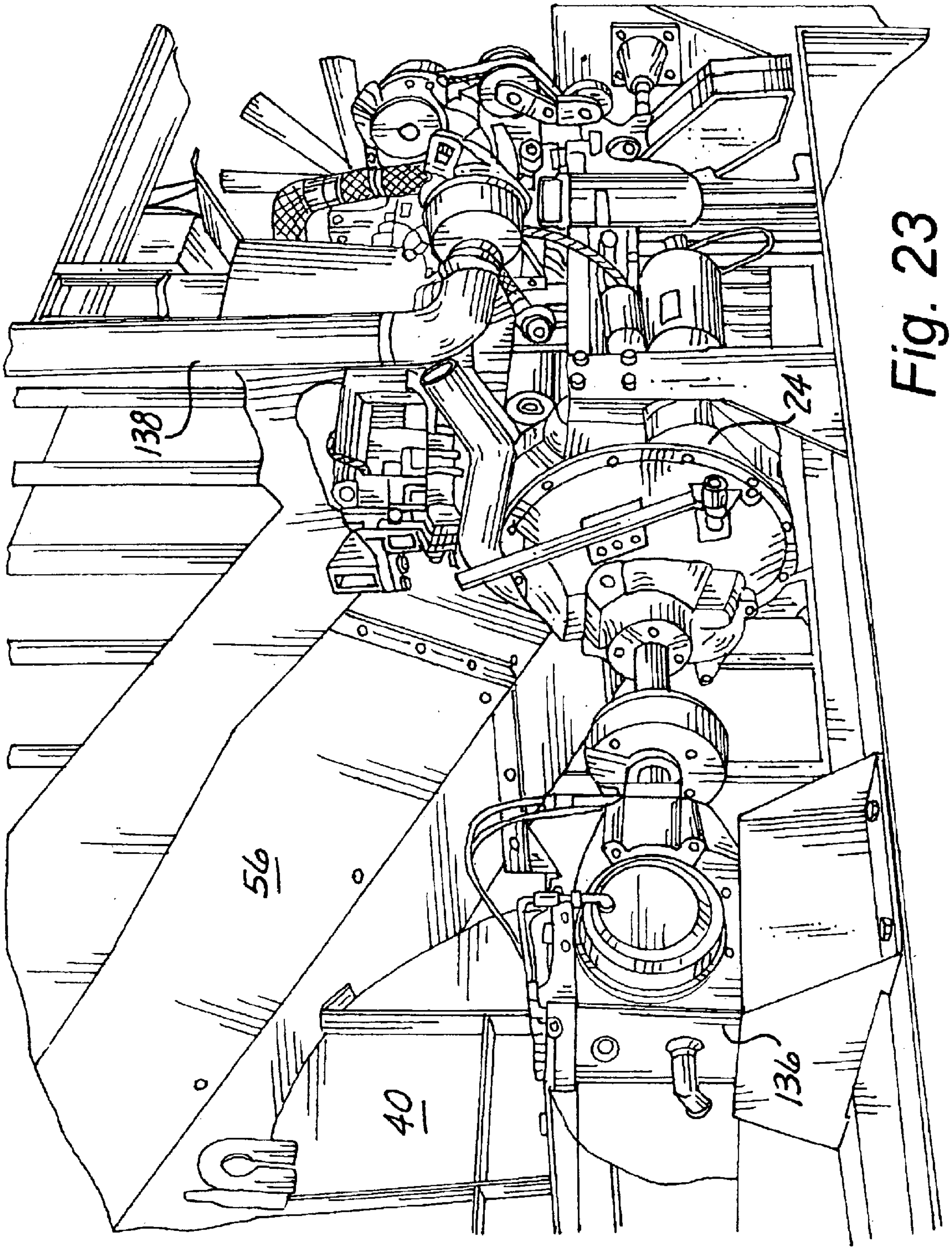
FIG. 23 is a perspective view of a diesel engine, 90 degree drive, blower, and a portion of the pre-conditioning unit of the apparatus.
Figure 24:
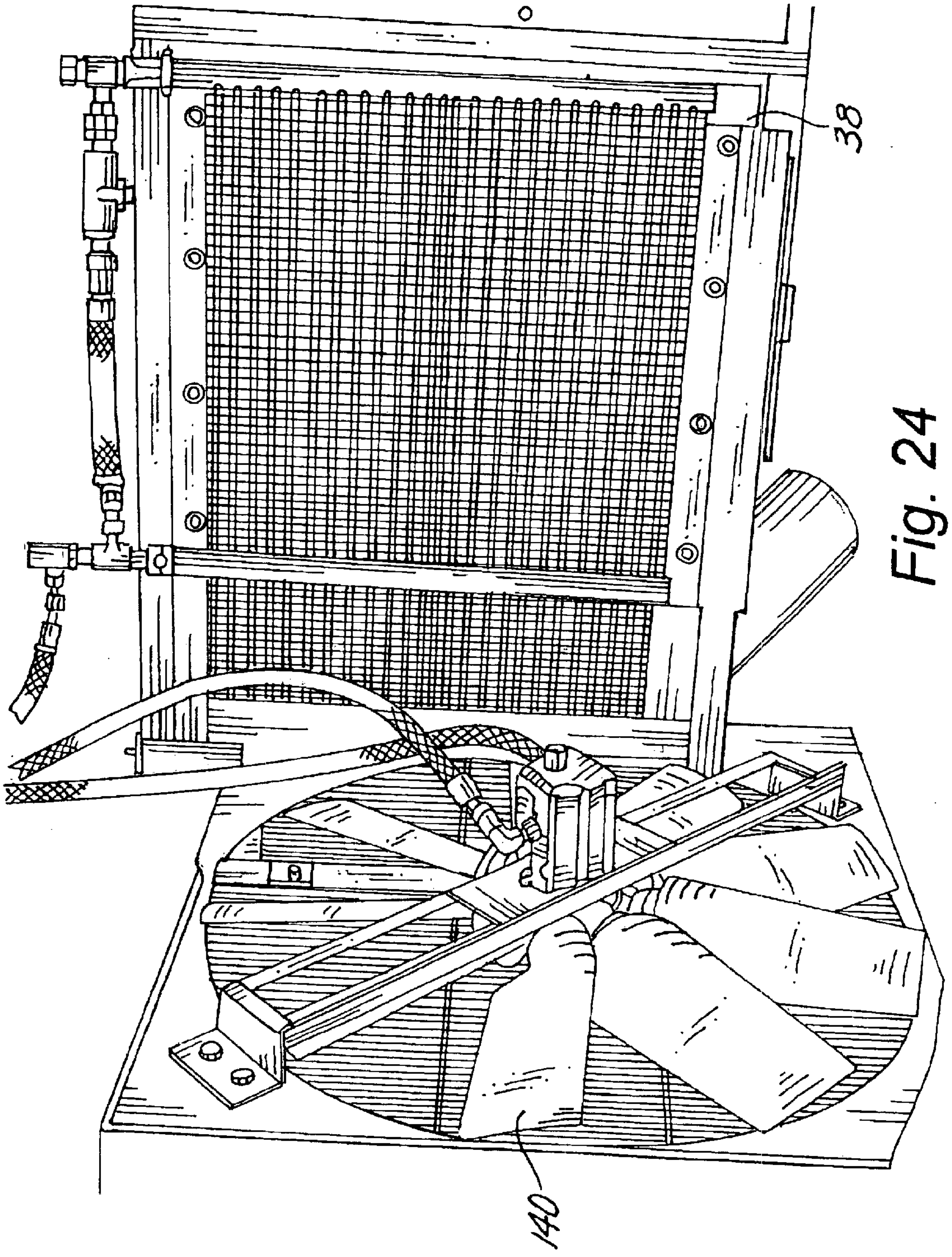
FIG. 24 is a perspective view of a fan and a radiator of the apparatus.
Figure 25:
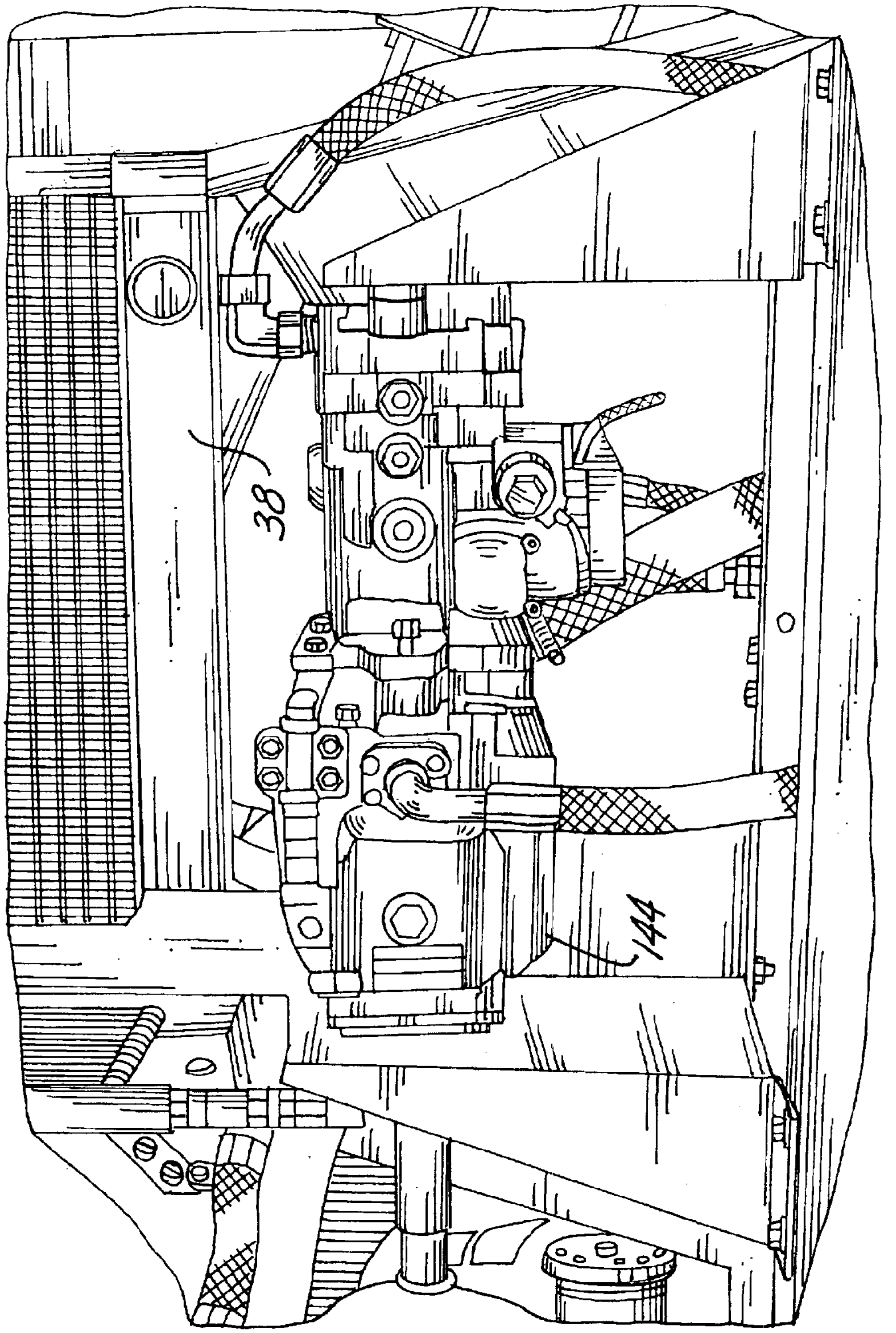
FIG. 25 is a perspective view of a hydraulic pump of the apparatus.
Figure 26:
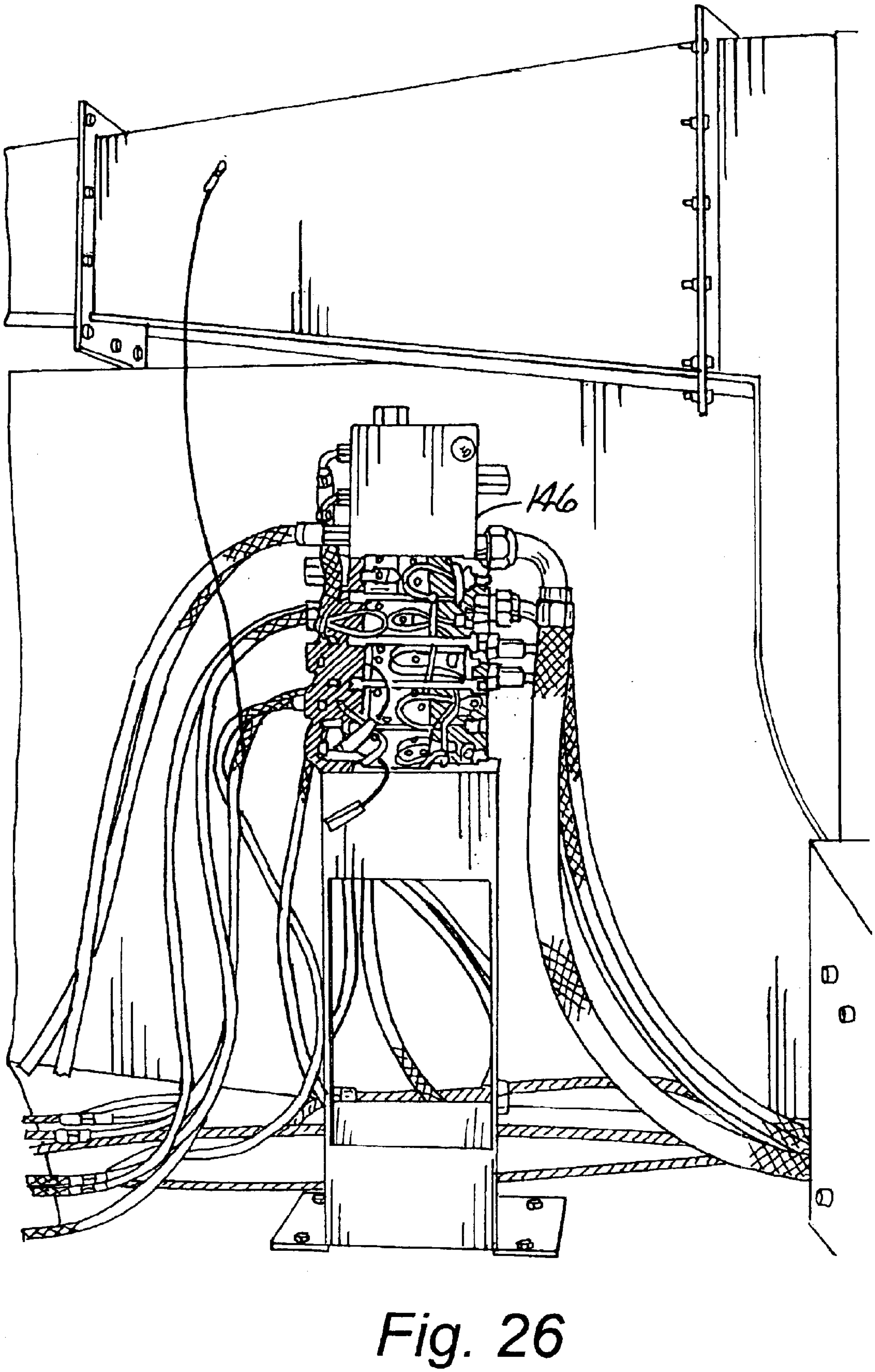
FIG. 26 is a side view of a hydraulic manifold of the apparatus.
Figure 27:
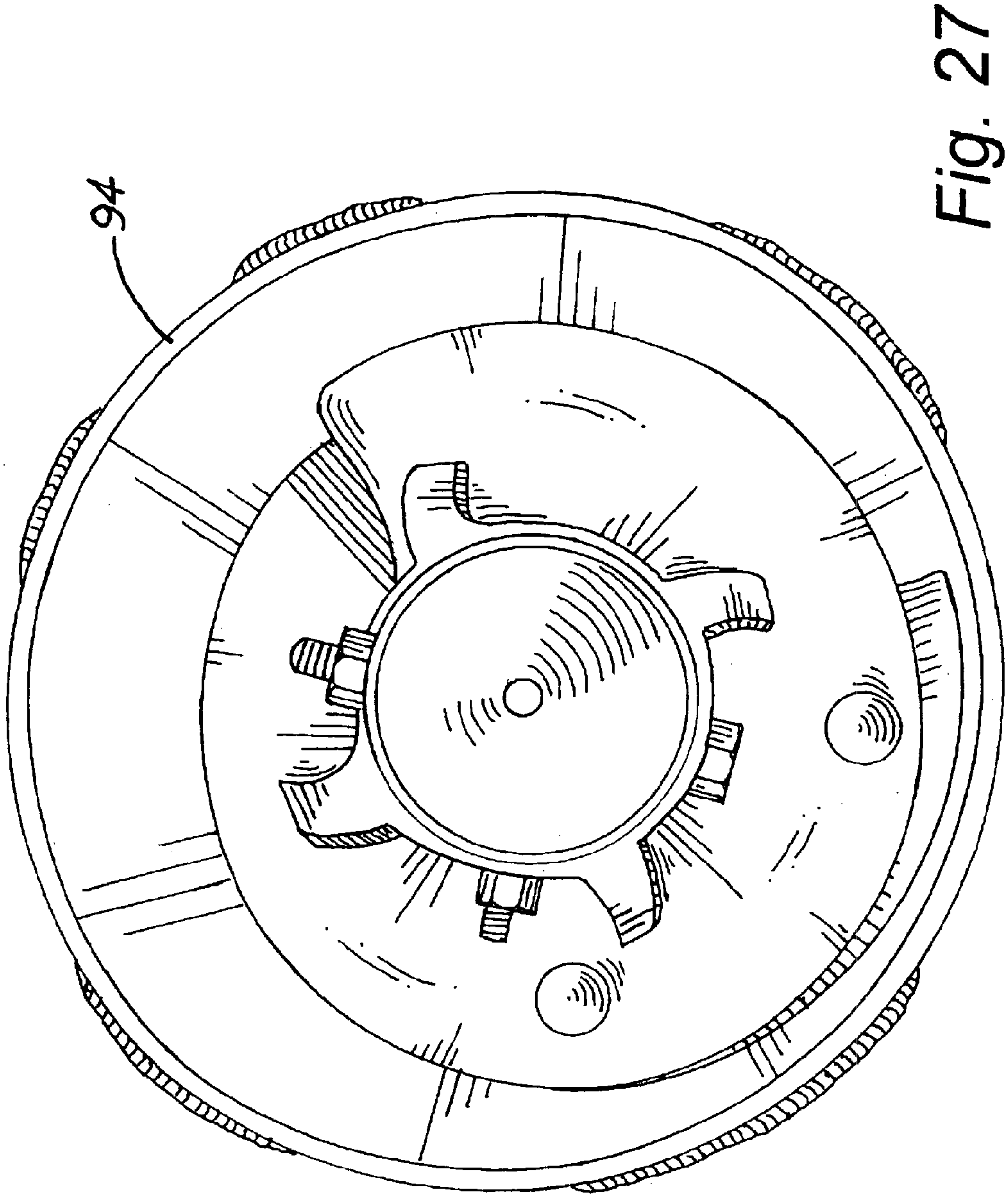
FIG. 27 is an end view of the discharge auger.

The apparatus 10 is completely powered by a diesel engine 24, which in the preferred embodiment of the invention is provided by Caterpillar Inc., namely a model CAT 3126B diesel engine (shown best in FIG. 23). A 90 degree drive 136 is attached to one end of the diesel engine 24 and to the blower 40 at the other end, and allows that diesel engine to power the blower 40. The 90 degree drive 136 is commercially available from Hub City Drive. Also connected to the diesel engine 24 is a radiator 38 and fan 140 to provide a means to control the temperature of the diesel engine 24 (see FIG. 24). A hydraulic pump 144 is attached to the diesel engine 24 at the end opposite to the 90 degree drive 136, and below the radiator 38 and fan 140 (see FIG. 25). The hydraulic pump 144 is powered by the diesel engine 24 and drives the various hydraulic systems in the apparatus 10. In the preferred embodiment of the invention the hydraulic pump 144 is a commercially available pump of the type provided by Vickers Hydraulic. FIG. 26 shows a hydraulic manifold 146 for connection of the various hydraulic lines between the hydraulic pump 144 and the various hydraulic systems of the apparatus 10

In this regard, the apparatus 10 includes the following hydraulically powered systems and/or components: (1) the core finder 118 of the second cyclone 32; (2) the intake hopper 14 auger drive 42; (3) the pre-conditioning auger 66; (4) the discharge auger 132; (5) a fan located internal to the wet scrubber 36; (6) a circulating pump located internal to the wet scrubber 36; (7) the grinder/air lock 26; and (8) a roof vent or skylight (not shown). Additionally, the apparatus 10 includes hydraulic hook ups to allow for a hydraulically driven extension to the discharge auger 132, in the case where such extensions are necessary to reach a specific disposal location.

FIGS. 22*a–d* shows various views of a fuel tank 16 used to store diesel fuel for the diesel engine 24, and a hydraulic fluid reservoir 18 used in connection with the various hydraulic systems and hydraulic pump 144. The fuel tank includes a plurality of internal baffles 148 to reduce the movement of the fuel in the tank when the apparatus 10 is in motion.

Figure 28:
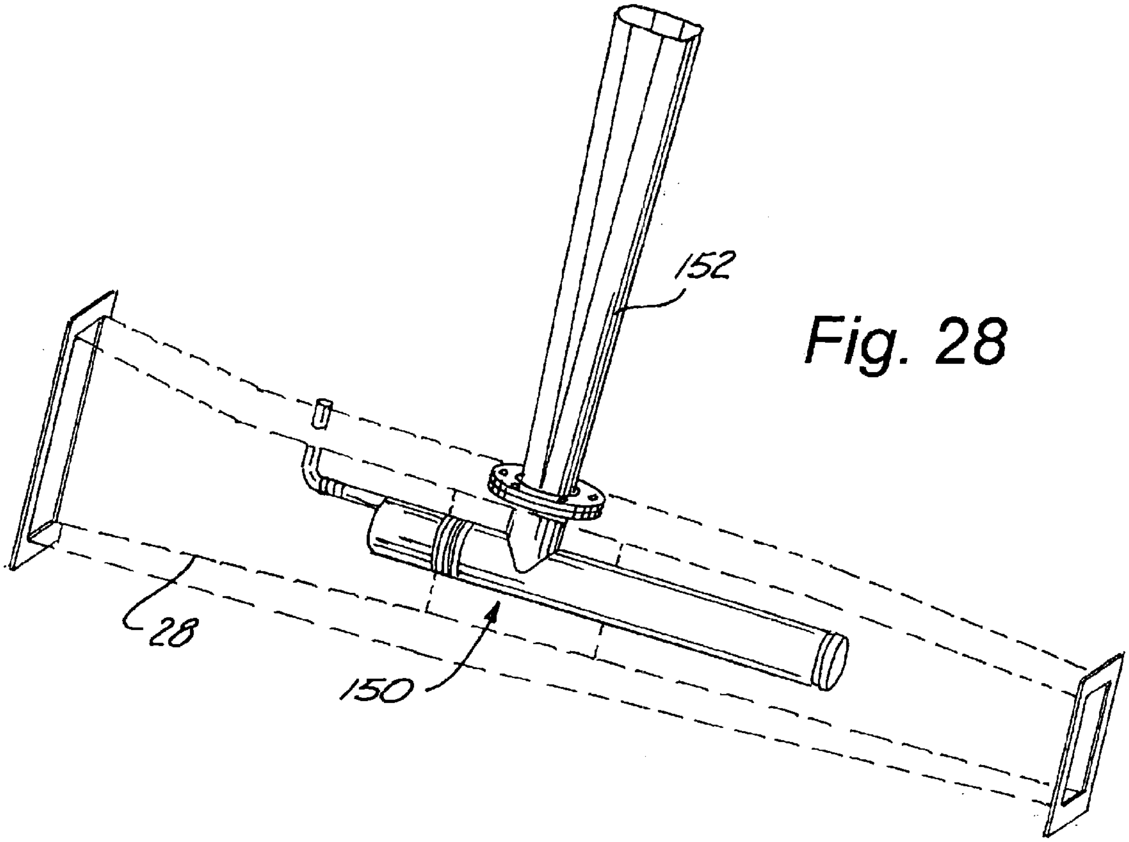
FIG. 28 is a perspective view of an alternative embodiment of the invention that utilizes an eductor.
Figure 29:
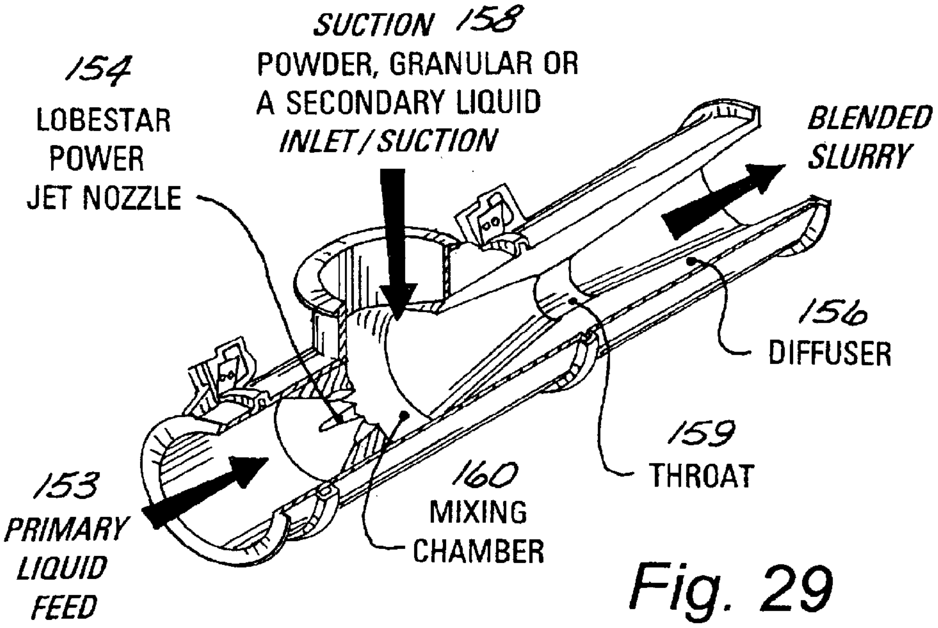
FIG. 29 is a perspective cut away view of a portion of the eductor.

The present invention also includes an alternative embodiment wherein the grinder/air lock 26 is replaced with an eductor 150 (shown generally in FIG. 28, and operatively in FIG. 29). In the referred embodiment of the invention the eductor 150 is a 4 inch LOBESTAR Mixing Eductor with a urethane insert nozzle sold by Votex Ventures Inc. of Houston Tex., which is of a type disclosed in U.S. Pat. Nos. 5,664,733 and 5,775,466 (which are incorporated herein by reference). A tube 152 connects the outlet 51 of the pre-conditioning unit 20 to the feed-through housing 28 and to the eductor 150. Thus, the wet material exiting the pre-conditioning unit 20 enters the eductor 150 through tube 152.

The eductor 150 is powered by a centrifugal or gear pump (not shown) that creates a pressurized fluid stream that enters the eductor 150 through a primary liquid feed 153. A nozzle 154 generates an axial and radial flow stream directed toward a mixing chamber 160. The pressurized fluid stream is converted from pressure-energy to high velocity as the fluid enters the nozzle 154 and exits in the radial and axial flow stream, which increases turbulence in the mixing chamber 160. The high velocity jet stream exiting the nozzle 154 produces a strong suction in the mixing chamber 160 that draws a secondary fluid such as the wet material through an inlet/suction port 158 and into the mixing chamber 160. An exchange of momentum occurs when the primary and secondary fluids interact. The turbulence between the two fluids produces a uniformly mixed stream traveling at a velocity intermediate between the motive and suction velocities through a narrowed fixed diameter throat 159 where the mixing is completed. The mix enters a diffuser 156 that is shaped to reduce velocity gradually and to convert velocity back into pressure at the discharge end of the diffuser 156 with a minimum loss of energy. At this point the mixture/wet material exits the eductor 158 and is moved by the air stream within the feed-through housing 28 for processing in the manner described hereinabove.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

What is claimed is:

1. A waste treatment apparatus for the treatment and processing of wet material, said apparatus comprising:
   - an inlet hopper adapted for receipt of the wet material;
   - a pre-conditioning unit having an input and an output end wherein the wet material is received from said inlet hopper at said input end and is conveyed to said output end wherein the wet material is processed to reduce moisture and pathogen content;
   - a blower for providing a forced air stream to direct the flow of the wet material and for directing the flow from said output end of said pre-conditioning unit;
   - a pre-separation cyclone operatively positioned for receiving the wet material from said output end of said pre-conditioning unit via said air stream powered by said blower, wherein the wet material is processed under the influence of cyclonic forces that further reduce the moisture content, pathogen content, and reduce the particle size of the wet material;

a separation cyclone operatively positioned for receiving the wet material from said pre-separation cyclone via said air stream powered by said blower, wherein the wet material is processed under the influence of cyclonic forces that separate the wet material into a substantially dry portion that exits from the lower portion of said separation cyclone and a substantially liquid or vapor portion that exits from an upper portion of said separation cyclone; and a wet scrubber operatively positioned for receiving said substantially liquid portion of the wet material.

2. The invention in accordance with claim 1 wherein said apparatus is remotely powered by a self contained engine.

3. The invention in accordance with claim 2 wherein said engine is a diesel engine.

4. The invention in accordance with claim 3 wherein said pre-conditioning unit utilizes the waste heat from said engine for said processing of the wet material.

5. The invention in accordance with claim 4 wherein said pre-conditioning unit includes an auger for moving the wet material from said input end to said output end of said pre-conditioning unit, and wherein coolant from said engine is moved through a core of said auger for transferring heat to the wet material to reduce moisture content and to reduce pathogens.

6. The invention in accordance with claim 5 wherein said pre-conditioning unit is surrounded by a helical shell with a helical coil contained therein and exhaust from said engine is moved through said shell and said coil for transferring heat to the wet material to reduce moisture content and to reduce pathogens.

7. The invention in accordance with claim 6 wherein said pre-conditioning unit is surrounded by a heater box and air channeled through a radiator of said engine is moved through said heater box for transferring heat to the wet material to reduce moisture content and to reduce pathogens.

8. The invention in accordance with claim 1 further comprising a grinder/air lock assembly operatively positioned between said pre-conditioning unit and said pre-separation cyclone and adapted for receiving the wet material from said output end of said pre-conditioning unit and for isolating said pre-conditioning unit from said air stream from said blower.

9. The invention in accordance with claim 1 further comprising an eductor operatively positioned between said pre-conditioning unit and said pre-separation cyclone and adapted for mixing the wet material with a fluid stream and for introducing said mixture into said air stream of said blower.

10. The invention in accordance with claim 1 wherein said apparatus is mobile.

11. The invention in accordance with claim 1 wherein said separation cyclone comprises a plurality of shear panels and with a plurality of inwardly protruding blades for impacting the wet material thereby reducing the particle size of the wet material.

12. The invention in accordance with claim 1 wherein said pre-separation cyclone comprises an adjustable core finder located within said pre-separation cyclone and provides a method of controlling the extent the wet material is processed therein.

13. The invention in accordance with claim 1 wherein said separation cyclone comprises an adjustable core finder located within said separation cyclone and provides a method of controlling the extent the wet material is processed therein.

14. The invention in accordance with claim 13 wherein said core finder is hydraulically adjustable.

* * * * *